(12) United States Patent
Onoe et al.

(10) Patent No.: US 11,454,149 B2
(45) Date of Patent: Sep. 27, 2022

(54) PARTICULATE FILTER

(71) Applicant: CATALER CORPORATION, Shizuoka (JP)

(72) Inventors: Ryota Onoe, Shizuoka (JP); Ryo Tasaki, Shizuoka (JP); Momoko Iwai, Shizuoka (JP); Yamato Matsushita, Shizuoka (JP)

(73) Assignee: CATALER CORPORATION, Shizuoka (JP)

( * ) Notice: Subject to any disclaimer, the term of this patent is extended or adjusted under 35 U.S.C. 154(b) by 0 days.

(21) Appl. No.: 17/285,290

(22) PCT Filed: Oct. 30, 2019

(86) PCT No.: PCT/JP2019/042464
§ 371 (c)(1),
(2) Date: Apr. 14, 2021

(87) PCT Pub. No.: WO2020/100582
PCT Pub. Date: May 22, 2020

(65) Prior Publication Data
US 2021/0381413 A1  Dec. 9, 2021

(30) Foreign Application Priority Data
Nov. 15, 2018 (JP) .............................. JP2018-215005

(51) Int. Cl.
*F01N 3/021* (2006.01)
*B01D 46/24* (2006.01)
(Continued)

(52) U.S. Cl.
CPC ......... *F01N 3/021* (2013.01); *B01D 46/2429* (2013.01); *B01D 46/24492* (2021.08);
(Continued)

(58) Field of Classification Search
CPC ...... F01N 3/021; F01N 3/0222; F01N 3/2803; F01N 3/101; F01N 3/2066;
(Continued)

(56) References Cited

U.S. PATENT DOCUMENTS 10,022,671 B2 * 7/2018 Sekine ..................... B01J 35/04
10,086,363 B2 * 10/2018 Onoe ...................... B01D 53/94
(Continued)

FOREIGN PATENT DOCUMENTS

EP    3162428 A1    5/2017
EP    3254759 A1   12/2017
(Continued)

OTHER PUBLICATIONS

Written Opinion of the International Search Authority, PCT Application No. PCT/JP2019/042464, dated Dec. 24, 2019 (14 Pages).
(Continued)

*Primary Examiner* — Brandon D Lee
(74) *Attorney, Agent, or Firm* — Occhiuti & Rohlicek LLP

(57) ABSTRACT

Provided is a particulate filter in which a PM collection rate is stably increased. The particulate filter according to the present invention includes a substrate 10 having a wall flow structure having a porous partition wall 16 that partitions an inlet cell and an outlet cell, and a wash coat layer held on surfaces of internal pores of the partition wall. In addition, average filling rates A, B, and C of the wash coat layer measured for each predetermined pore diameter range in the internal pores satisfy specific relationships. Further, the wash coat layer is formed in a region that occupies 50% or more of a thickness of the partition wall, and an amount of a noble metal catalyst carried by the wash coat layer is 0 g/L or more but 0.2 g/L or less.

6 Claims, 5 Drawing Sheets

(51) Int. Cl.
  *B01D 53/94* (2006.01)
  *B01J 23/63* (2006.01)
  *B01J 35/04* (2006.01)
  *F01N 3/28* (2006.01)
  *F01N 3/022* (2006.01)
  *F01N 3/10* (2006.01)
  *F01N 3/20* (2006.01)

(52) U.S. Cl.
  CPC .............. *B01D 53/94* (2013.01); *B01J 23/63* (2013.01); *B01J 35/04* (2013.01); *F01N 3/0222* (2013.01); *F01N 3/2803* (2013.01); *B01D 2255/1021* (2013.01); *B01D 2255/2092* (2013.01); *B01D 2255/407* (2013.01); *B01D 2255/9155* (2013.01); *B01D 2255/9202* (2013.01); *F01N 3/101* (2013.01); *F01N 3/2066* (2013.01); *F01N 2330/00* (2013.01); *F01N 2370/02* (2013.01); *F01N 2370/22* (2013.01)

(58) Field of Classification Search
  CPC ............. F01N 2330/00; F01N 2370/02; F01N 2370/22; F01N 3/2828; F01N 2330/06; F01N 2330/30; F01N 2510/068; F01N 3/035; B01D 46/2429; B01D 46/24492; B01D 53/94; B01D 2255/1021; B01D 2255/2092; B01D 2255/407; B01D 2255/9155; B01D 2255/9202; B01D 46/2474; B01D 46/2482; B01D 2255/1023; B01D 2255/92; B01D 2258/012; B01D 53/944; B01J 23/63; B01J 35/04; Y02T 10/12
  See application file for complete search history.

(56) References Cited

U.S. PATENT DOCUMENTS

| | | | |
|---|---|---|---|
| 10,981,113 B2* | 4/2021 | Onoe | .................... B01D 53/94 |
| 2009/0087365 A1 | 4/2009 | Klingmann et al. | |
| 2014/0220294 A1 | 8/2014 | Ono et al. | |
| 2017/0095798 A1 | 4/2017 | Onoe et al. | |
| 2017/0122176 A1 | 5/2017 | Nomura et al. | |
| 2017/0274323 A1 | 9/2017 | Yamamoto et al. | |
| 2018/0028973 A1 | 2/2018 | Sumiya | |
| 2018/0133648 A1 | 5/2018 | Sekine et al. | |

FOREIGN PATENT DOCUMENTS

| | | | |
|---|---|---|---|
| EP | 3673996 | A1 | 7/2020 |
| JP | 2007185571 | A | 7/2007 |
| JP | 2007229619 | A | 9/2007 |
| JP | 2009082915 | A | 4/2009 |
| JP | 2010184183 | A | 8/2010 |
| JP | 2013043138 | A | 3/2013 |
| JP | 2017072033 | A | 4/2017 |
| JP | 2017082745 | A | 5/2017 |
| JP | 2017171553 | A | 9/2017 |
| JP | 2017217646 | A | 12/2017 |
| WO | 2017119101 | A1 | 7/2017 |
| WO | 2017163984 | A1 | 9/2017 |
| WO | 2017209083 | A1 | 12/2017 |
| WO | 2019058948 | A1 | 3/2019 |

OTHER PUBLICATIONS

Extended European Search Report, dated May 26, 2021 (8 pages).

* cited by examiner (a) EXAMPLE 1

(b) EXAMPLE 3

(c) EXAMPLE 11

(d) EXAMPLE 15

PARTICULATE FILTER

CROSS-REFERENCE TO RELATED APPLICATIONS

This application is a national phase under 35 U.S.C. 371 of International Application No. PCT/JP2019/042464 filed on Oct. 30, 2019, which claims priority to Japanese Application No. 2018-215005 filed on Nov. 15, 2018, the contents of all of which are hereby incorporated by reference in their entireties.

TECHNICAL FIELD

The present invention relates to a particulate filter. More specifically, the present invention relates to a particulate filter that collects particulates (particulate matter) contained in an exhaust gas emitted from an internal combustion engine such as a gasoline engine. Priority is claimed on Japanese Patent Application No. 2018-215005, filed Nov. 15, 2018, the content of which is incorporated herein by reference.

BACKGROUND ART

Exhaust gas from an internal combustion engine that uses gasoline, diesel oil, or the like as fuel contains gaseous components such as hydrocarbons (HC), carbon monoxide (CO), and nitrogen oxides (NOx) as well as particulate matter (PM) containing carbon as a main component, which are known to cause air pollution. With regard to the particulate matter (PM; hereinafter, this may be simply referred to as "PM"), regulations on emissions have been tightened year by year along with those on gas components such as HC, CO, and NOx, and research is being conducted on techniques for collecting and removing PM from exhaust gas.

Conventionally, particulate filters for collecting and removing PM from exhaust gas have been disposed side by side in an exhaust path of an internal combustion engine in combination with, for example, an exhaust gas purification catalyst containing noble catalyst metals for purifying gas components. As such a particulate filter, a so-called wall flow type filter, which is composed of a porous substrate having a honeycomb structure, and in which inlets and outlets of a large number of cells, which are hollow portions of the substrate, are alternately closed, is known (Patent Literature 1 and 2). In a wall flow type particulate filter, exhaust gas flowing in from inlets of cells passes through porous partition walls of the cells while moving in the cells and is discharged to outlets of the cells. In addition, while the exhaust gas passes through the porous partition walls of the cells, PM is collected in pores inside the partition walls. In such a particulate filter, a wash coat may be provided on a surface of the substrate in order to provide a stable collection surface even at high temperatures. In addition, in recent years, a filter catalyst, in which a particulate filter and an exhaust gas purification catalyst are integrated by causing a wash coat of a particulate filter to contain a noble catalyst metal, has also been provided.

CITATION LIST

Patent Literature

Patent Literature 1: Japanese Patent Application Publication No. 2009-82915
Patent Literature 2: Japanese Patent Application Publication No. 2007-185571

SUMMARY OF INVENTION

Technical Problem

It is known that a PM collection rate of such a filter catalyst gradually becomes greater as traveling increases. For example, when a real driving emission (RDE) test for measuring exhaust gas during actual driving of a car on a public road is repeated, the PM collection rate may reach 95% or higher, as shown in Table 1 below. This is based on the increase in the PM collection effect as more PM accumulates in the filter catalyst. However, considering recent circumstances in which regulations on PM emissions for gasoline direct injection vehicles are being tightened, improvement of PM collection techniques is strongly required.

TABLE 1

| RDE traveling number N | Collection rate (%) |
|---|---|
| 1 | 54.6 |
| 2 | 91.9 |
| 3 | 95.9 |
| 4 | 96.6 |
| 5 | 96.9 |
| 6 | 97.1 |

The present invention has been made in view of such circumstances and a main object thereof is to provide, for example, a particulate filter in which a PM collection rate is increased from a first travel.

Solution to Problem

As a result of diligent studies to solve the above problems, the present inventors have found that, in a particulate filter having a wall flow structure, PM is scattered in pores of partition walls and is easily trapped in relatively small pores. In addition, in the particulate filter, a PM collection rate is increased as captured PM accumulates on a filter due to continuous traveling. Here, in a case in which a noble metal catalyst contained in the particulate filter has high activity, PM may be burned and eliminated even in a traveling mode. Thus, it has been found that the PM collection rate would decrease due to a decrease in amount of PM deposited due to this phenomenon. Therefore, the present inventors have found that PM collecting performance can be maintained stable and high by preferentially disposing a wash coat in large pores while leaving small pores for capturing PM in a specific proportion, and then significantly reducing an amount of a noble metal catalyst, and thereby completed the present invention.

That is, a particulate filter according to the present invention is a particulate filter disposed in an exhaust path of an internal combustion engine and is used to collect particulate matter from exhaust gas discharged from the internal combustion engine. This particulate filter includes a substrate having a wall flow structure having a porous partition wall partitioning an inlet cell that has an open end portion on an exhaust gas inflow side and an outlet cell that is adjacent to the inlet cell and has an open end portion on an exhaust gas outflow side, and wash coat layers formed inside the partition wall. The wash coat layers are held on surfaces of internal pores of the partition wall. Among the internal pores of the partition wall, an average filling rate A of wash coat layers held in a first pore group having a pore diameter of 5

μm or more but less than 10 μm, an average filling rate B of wash coat layers held in a second pore group having a pore diameter of 10 μm or more but less than 20 μm, and an average filling rate C of wash coat layers held in a third pore group having a pore diameter of 20 μm or more satisfy the following relationship: A<B<C; and B≤40%, and among pores of the first pore group and the second pore group, a proportion of pores in which a filling rate of a wash coat layer is 75% or more is 35% by number or less. Further, the wash coat layer is formed in a region that occupies 50% or more of a thickness of the partition wall from at least a part of a surface of the partition wall facing at least one of the inlet cell and the outlet cell, and an amount of a noble metal catalyst carried by this wash coat layer is 0 g/L or more but 0.2 g/L or less. With the particulate filter having such a configuration, PM collecting performance can be effectively improved. As a result, a high PM collection rate can be realized without waiting for PM to accumulate in the filter. Further, in the configuration including the noble metal catalyst, the filter can be effectively regenerated while a carried amount of the noble metal catalyst is inhibited.

In a preferred embodiment of the particulate filter disclosed herein, the wash coat layer does not contain the noble metal catalyst. With such a configuration, a particulate filter having excellent PM collecting performance can be provided at a low cost.

In a preferred embodiment of the particulate filter disclosed herein, when a direction from the exhaust gas inflow side to the exhaust gas outflow side is defined as a flow direction, the wash coat layer includes an upstream wash coat layer that includes a surface of the partition wall facing the inlet cell and is provided in a region in the flow direction from an end portion on the exhaust gas inflow side and a downstream wash coat layer that includes a surface of the partition wall facing the outlet cell and is provided in a region in the flow direction from an end portion on the exhaust gas outflow side, and a length $L_A$ of the upstream wash coat layer from the end portion on the exhaust gas inflow side in the flow direction is preferably ½ or more of a total length L of the substrate. Further, a length $L_B$ of the downstream wash coat layer from the end portion on the exhaust gas outflow side in the flow direction is preferably ½ or more of the total length L of the substrate. Thus, the wash coat layer can be efficiently disposed in a region, through which a larger amount of exhaust gas passes, of the partition wall. As a result, the above effects can be obtained more efficiently at a lower cost, for example, as compared with a case in which the wash coat layer contains a catalyst.

In a preferred embodiment of the particulate filter disclosed herein, the average filling rate A satisfies 10%≤A≤35%, the average filling rate B satisfies 15%≤B≤40%, and the average filling rate C satisfies 20%≤C≤45%. By providing a difference between the average filling rates within the above range according to each pore diameter range in this way, the PM collecting performance can be improved to a higher level.

In a preferred embodiment of the particulate filter disclosed herein, the internal combustion engine is a gasoline engine. In a gasoline engine, a temperature of an exhaust gas is relatively high, and PM is unlikely to accumulate in a partition wall. For that reason, in the case in which the internal combustion engine is a gasoline engine, the above-mentioned effects are more effectively exhibited.

DESCRIPTION OF EMBODIMENTS

Hereinafter, preferred embodiments of the present invention will be described with reference to the figures. Also, matters other than those specifically mentioned in the present specification that are necessary for carrying out the present invention (for example, general matters such as arrangement of a particulate filter in an automobile) may be understood as design matters for those skilled in the art based on conventional arts in the relevant field. The present invention can be carried out on the basis of the content disclosed in the present specification and common technical knowledge in the relevant field. Further, in the present specification, the expression "A to B" representing a numerical range indicates "A or more and B or less".

Figure 1:
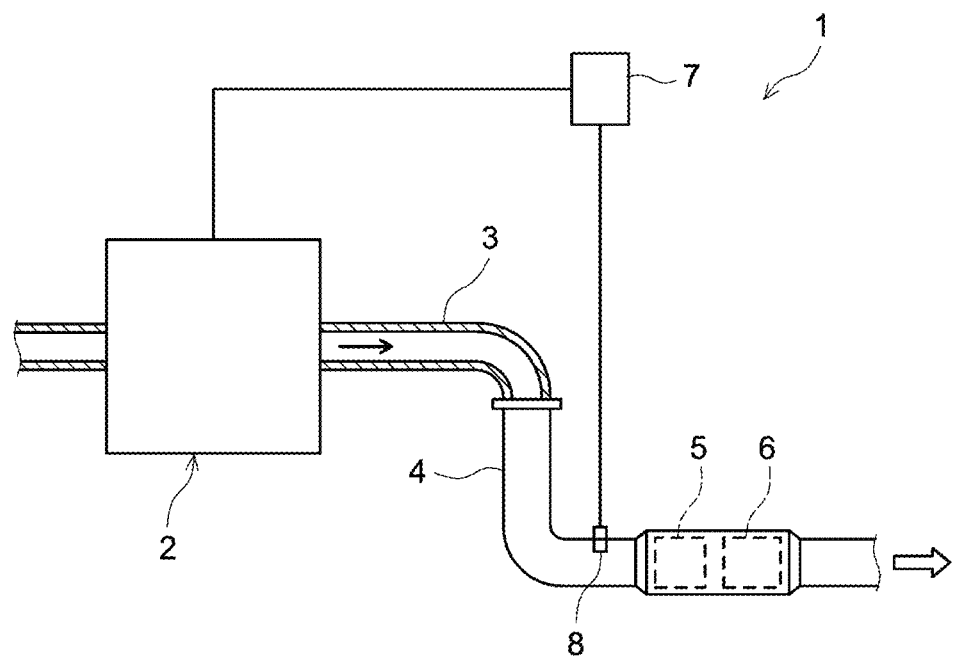
FIG. 1 is a diagram schematically showing an arrangement of a particulate filter according to an embodiment in an exhaust path.

First, an outline of a particulate filter according to an embodiment of the present invention will be described. FIG. 1 is a diagram schematically showing an internal combustion engine (which may be an engine) 2 and an exhaust gas purification device 1 provided in an exhaust system of the internal combustion engine 2. The particulate filter disclosed herein is provided in the exhaust system of the internal combustion engine 2 as a component of the exhaust gas purification device 1.

An air-fuel mixture containing oxygen and fuel gas is supplied to the internal combustion engine 2. The internal combustion engine 2 converts heat energy generated by burning this air-fuel mixture into kinetic energy. The air-fuel mixture burned at this time becomes the exhaust gas and is discharged to an exhaust path. The internal combustion engine 2 having the configuration shown in FIG. 1 is not limited thereto and is mainly configured of a gasoline engine of an automobile.

The exhaust system of the internal combustion engine 2 will be described. The internal combustion engine 2 is connected to an exhaust path at an exhaust port (not shown). The exhaust path in FIG. 1 is configured of an exhaust manifold 3 and an exhaust pipe 4. The internal combustion engine 2 is connected to the exhaust pipe 4 via the exhaust manifold 3. In addition, the exhaust gas circulates inside the exhaust pipe 4. The arrows in the figure indicate a flow direction of the exhaust gas. Also, in the present specification, a side close to the engine 2 along a flow of the exhaust gas may be referred to as an upstream side, and a side far from the engine 2 may be referred to as a downstream side.

The exhaust gas purification device 1 typically includes a catalyst unit 5, a filter unit 6, an engine control unit (ECU) 7, and a sensor 8. The exhaust gas purification device 1 purifies harmful components (for example, carbon monoxide (CO), hydrocarbons (HC), and nitrogen oxides ($NO_x$)) contained in the exhaust gas and collects particulate matter (PM) contained in the exhaust gas.

The catalyst unit 5 and the filter unit 6 are provided inside the exhaust pipe 4 communicating with the engine 2. The catalyst unit 5 is configured to be able to purify ternary components (NOx, HC, and CO) contained in the exhaust gas. A type of catalyst contained in the catalyst unit 5 is not particularly limited. The catalyst unit 5 may include, for example, a catalyst in which a noble metal such as platinum (Pt), palladium (Pd), or rhodium (Rd) is contained. Also, the catalyst unit 5 may further include a downstream side catalyst unit (not shown) in the exhaust pipe 4 on the downstream side of the filter unit 6. Since a specific configuration of the catalyst unit 5 is not a feature of the present invention, detailed description thereof will be omitted here.

Figure 2:
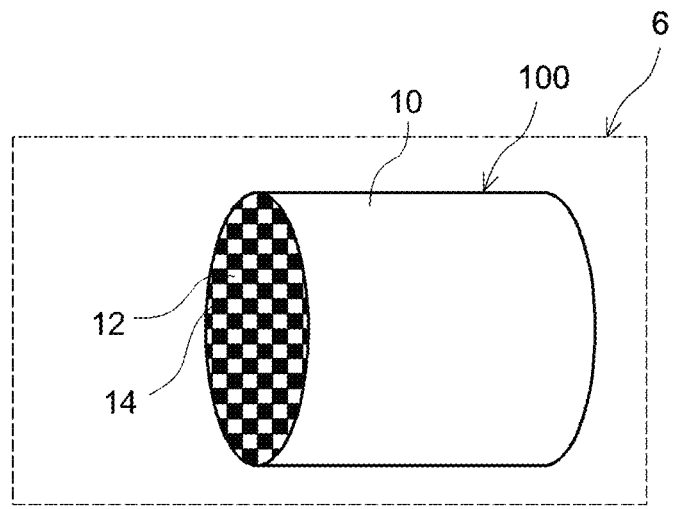
FIG. 2 is a perspective view schematically showing the particulate filter according to the embodiment.

The filter unit 6 is provided on the downstream side of the catalyst unit 5. As shown in FIG. 2, the filter unit 6 includes a particulate filter 100 disclosed herein. The particulate filter 100 of the present example is a gasoline particulate filter (GPF) capable of collecting and removing PM contained in the exhaust gas, which has been subjected to a wash coat treatment. Hereinafter, the particulate filter 100 according to the present embodiment will be described in detail.

The ECU 7 is electrically connected to the internal combustion engine 2 and the sensor 8. The ECU 7 receives signals from various sensors (for example, an oxygen sensor, a temperature sensor, and a pressure sensor) 8 that detect an operating state of the internal combustion engine 2 and controls driving of the internal combustion engine 2. A configuration of the ECU 7 may be the same as a conventional one and is not particularly limited. The ECU 7 is, for example, a processor or an integrated circuit. The ECU 7 receives, for example, information such as an operating state of a vehicle or the like detected by various sensors 8 and an amount, a temperature, a pressure, etc., of the exhaust gas discharged from the internal combustion engine 2. Further, the ECU 7 performs operation control such as fuel injection control, ignition control, and intake air amount adjustment control (for example, air-fuel ratio control) for the internal combustion engine 2, for example, in accordance with the received information.

Figure 3:
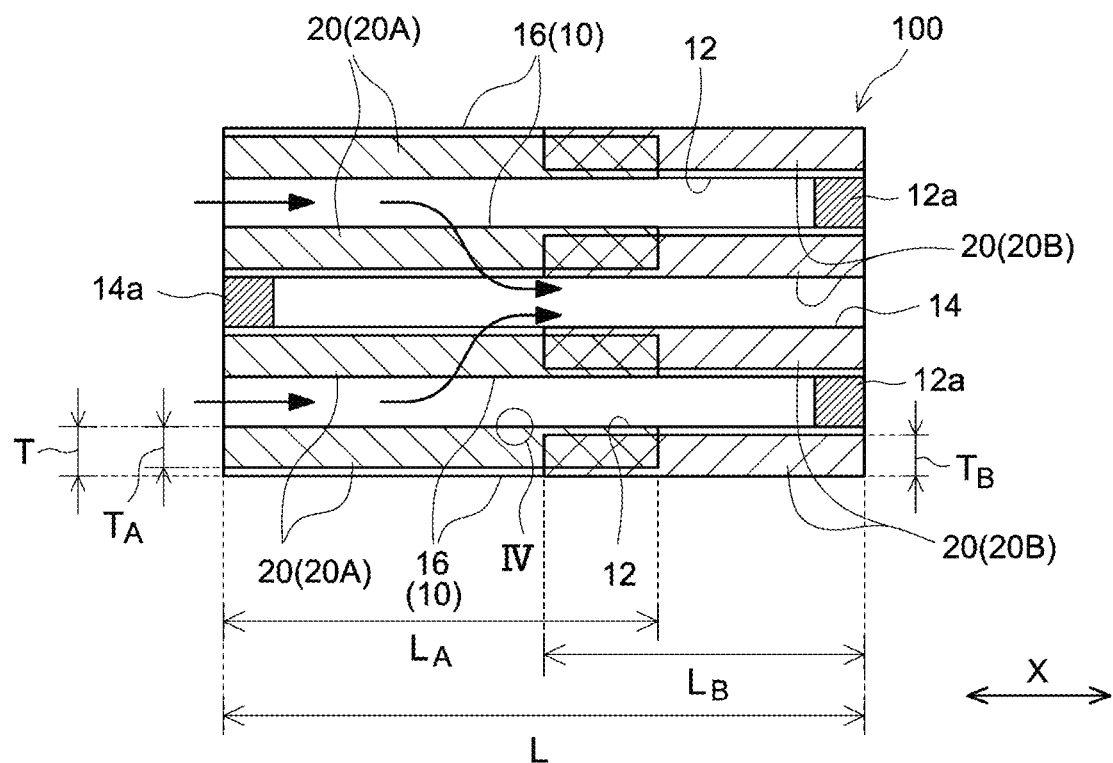
FIG. 3 is a cross-sectional view schematically showing a cross-section of the particulate filter according to the embodiment.
Figure 4:
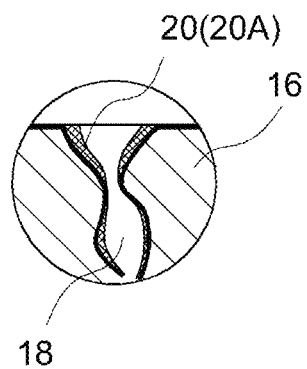
FIG. 4 is an enlarged cross-sectional schematic view of region IV in FIG. 3.

FIG. 2 is a perspective view of the particulate filter 100 according to the embodiment. Reference sign X in FIG. 2 is a first direction of the particulate filter 100. The particulate filter 100 is installed in the exhaust pipe 4 such that its first direction X is in the flow direction of the exhaust gas. For convenience, one direction X1 of the first direction X may be referred to as an exhaust gas inflow side (upstream side), and the other direction X2 may be referred to as an exhaust gas outflow side (downstream side). FIG. 3 is an enlarged schematic view of a part of a cross-section of the particulate filter 100 along the first direction X. FIG. 4 is an enlarged schematic view of region IV in FIG. 3. As shown in FIGS. 2 to 4, the particulate filter 100 disclosed herein includes a substrate 10 having a wall flow structure and a wash coat layer 20. Hereinafter, the substrate 10 and the wash coat layer 20 will be described in order.

<Substrate 10>

For the substrate 10, filters of various materials and forms conventionally used for this kind of use can be used. For example, a substrate 10 formed of ceramics such as cordierite and silicon carbide (SiC) or an alloy (stainless steel or the like) can be preferably adopted. As an example, a substrate having a cylindrical outer shape (the present embodiment) is exemplified. However, for an outer shape of the entire substrate, an elliptical pillar shape, a polygonal pillar shape, or the like may be adopted instead of a cylindrical shape. Such a substrate 10 typically has a so-called honeycomb structure. Cavities (cells) in the honeycomb structure extend in the first direction X. The cells include inlet cells 12 and outlet cells 14 adjacent to the inlet cells 12. The substrate 10 includes porous partition walls 16 that partition the inlet cells 12 and the outlet cells 14. In the present specification, a dimension of a component such as the substrate 10 in the first direction X is referred to as a length.

<Inlet Cell 12 and Outlet Cell 14>

The inlet cell 12 is a cell provided in the substrate, of which an end portion on the exhaust gas inflow side is open and the outflow side is closed. The outlet cell 14 is positioned adjacent to the inlet cell 12 and is a cell of which an end portion on the exhaust gas outflow side is open and the inflow side is closed. In the present embodiment, the inlet cell 12 is sealed with a sealing portion 12a at an end portion thereof on the exhaust gas outflow side. The outlet cell 14 is sealed with a sealing portion 14a at an end portion thereof on the exhaust gas inflow side. The sealing portions 12a and 14a are airtightly fixed to the partition wall 16, which will be described later. The inlet cell 12 and the outlet cell 14 may be set to have appropriate shapes and sizes in consideration of a flow rate and components of the exhaust gas supplied to the particulate filter 100. For example, shapes of the inlet cell 12 and the outlet cell 14 in a cross-section orthogonal to the first direction X (hereinafter simply referred to as a "cross-section") may be various geometric shapes such as a quadrangle including a square, a parallelogram, a rectangle, a trapezoid, and the like, a triangle, another polygon (for example, a hexagon, or an octagon), and a circle. Further, a cross-sectional area of the inlet cell 12 and a cross-sectional area of the outlet cell 14 in the above cross-section may be the same or may have different structures (high ash capacity (HAC)). In the present embodiment, the inlet cell 12 and the outlet cell 14 are disposed in a checkered pattern (see FIG. 2).

<Partition Wall 16>

The partition wall 16 is disposed between the inlet cell 12 and the outlet cell 14. The partition wall 16 is configured to surround the cells 12 and 14 in a cross-section. The partition wall 16 extends in the first direction X. The partition wall 16 forms and partitions the inlet cell 12 and the outlet cell 14. The partition wall 16 has a porous structure through which the exhaust gas can pass. A porosity of the partition wall 16 is not particularly limited, but is appropriately set to about 40% to 70%, preferably 55% to 65%. If the porosity of the partition wall 16 is too small, a pressure loss may increase, which is not preferable. On the other hand, if the porosity of the partition wall 16 is too large, a mechanical strength of the particulate filter 100 tends to decrease, which is not preferable. The porosity of the partition wall 16 is also appropriate from the viewpoint of preferentially disposing a slurry, which will be described later, in large pores of the partition wall 16. An average pore diameter of the partition wall 16 is not particularly limited, but is generally 5 μm to 50 μm, for example, 10 μm to 30 μm, and preferably 10 μm to 25 μm, from the viewpoint of PM collection efficiency and inhibiting a pressure loss increase. The average pore diameter of the partition wall 16 is also preferable from the viewpoint of preferentially disposing the wash coat layer 20, which will be described later, in the large pores of the partition wall 16. A thickness of the partition wall 16 is not particularly limited, but is preferably about 0.2 mm to 1.6 mm. When the thickness of the partition wall is within such a range, the effect of inhibiting an increase in pressure loss can be obtained without impairing the PM collection efficiency. The thickness of the partition wall 16 is also preferable from the viewpoint of preferentially disposing the slurry, which will be described later, in the large pores of the partition wall 16.

Also, the "average pore diameter" of the porous partition wall 16 in the present specification is the median diameter ($D_{50}$) based on a particle size distribution of Heywood diameters of N pores virtually separated on the basis of cross-sectional image analysis of the substrate using electron microscope observation, which will be described later. Further, the thickness/the thickness direction of the partition wall 16 is a direction in which a dimension/a distance between the inlet cell 12 and the outlet cell 14 in the cross-section corresponding to the distance is measured. In addition, a thickness of the wash coat layer 20, which will be described later, is also set to a dimension measured in the thickness direction of the partition wall 16.

<Wash Coat Layer 20>

The wash coat layer 20 is a coating layer provided on at least a part of a surface of the substrate 10. The wash coat layer 20 can have, for example, a function of expanding a surface area of the substrate 10, enhancing high temperature stability, enhancing properties such as absorptivity, and solidifying a matrix of the substrate 10. Therefore, the wash coat layer 20 is not limited by presence or absence of a noble metal catalyst, which will be described later, a forming method, and the like. As shown in FIG. 3, the wash coat layer 20 disclosed herein is provided inside the porous partition wall 16. More specifically, the wash coat layer 20 is held on a surface of an internal pore 18 of the partition wall 16, as shown in FIG. 4.

The wash coat layer 20 may be formed as a porous layer mainly composed of a heat-resistant material. Here, the term "mainly" indicates that a component is contained in an amount of 50% by mass or more (typically 85% by mass or more). The heat-resistant material may be, for example, a refractory material specified in JIS R 2001. Typical examples of the heat-resistant material include a neutral refractory such as alumina, an acidic refractory such as silica or zirconia, and a basic refractory such as magnesia or calcia. Also, the heat-resistant material may contain various rare earth metal oxides, alkaline earth metal oxides, and the like. Any one of these may be contained alone, or two or more thereof may be contained as a mixture or a complex. Examples of the complex include, for example, a ceria-zirconia composite oxide. In one preferred embodiment among them, the wash coat layer 20 is mainly composed of alumina (preferably activated alumina). Further, these materials may contain other materials (typically inorganic oxides) as subcomponents. The subcomponents may be added in the form of an element to a component that will be a main body, for example. Examples of such subcomponents include rare earth elements such as lanthanum (La) and yttrium (Y), alkaline earth elements such as calcium, alkali metal elements, and other transition metal elements.

In the present embodiment, the wash coat layer 20 includes an upstream wash coat layer 20A formed in a region including a surface of the partition wall 16 facing the inlet cell 12 and a downstream wash coat layer 20B formed in a region including a surface of the partition wall 16 facing the outlet cell 14.

The upstream wash coat layer 20A may be disposed at an upstream portion including an end portion of the substrate 10 on the exhaust gas inflow side. The downstream wash coat layer 20B may be disposed at a downstream portion including an end portion of the substrate 10 on the exhaust gas outflow side. Although not limited thereto, the upstream wash coat layer 20A may be formed in a region that occupies 50% or more of a thickness T of the partition wall 16 from the surface of the partition wall 16 facing the inlet cell 12 toward the outlet cell 14 side in the thickness direction of the partition wall 16. As a result, it is possible to secure an opportunity for the exhaust gas passing through the partition wall 16 to come into contact with the wash coat layer 20. The upstream wash coat layer 20A is preferably formed in a region of 60% or more of the thickness T of the partition wall 16, and further preferably in a region of 70% to 100%. That is, when a thickness of the upstream wash coat layer 20A from the surface of the partition wall 16 facing the inlet cell 12 is set to $T_A$, this $T_A$ may be $T_A$=0.5 T to 1 T and is provided to preferably satisfy 0.6 T to 1 T, and more preferably $T_A$=0.7 T to 1 T.

Further, the downstream wash coat layer 20B may be formed in a region that occupies 50% or more of the thickness T of the partition wall 16 from the surface of the partition wall 16 facing the outlet cell 14 toward the inlet cell 12 side in the thickness direction of the partition wall 16. As a result, it is possible to secure an opportunity for the exhaust gas passing through the partition wall 16 to come into contact with the wash coat layer 20. The downstream wash coat layer 20B is preferably formed in a region of 60% or more of the thickness T of the partition wall 16 and may be formed in a region of 70% to 100%. That is, when a thickness of the downstream wash coat layer 20B from the surface of the partition wall 16 facing the outlet cell 14 is set to $T_B$, this $T_B$ may be $T_B$=0.5 T to 1 T and is provided to preferably satisfy 0.6 T to 1 T, and more preferably $T_B$=0.7 T to 1 T. Among them, the upstream wash coat layer 20A and the downstream wash coat layer 20B preferably satisfy the following relationship of $T_A+T_B \geq T$, and for example, both the upstream wash coat layer 20A and the downstream wash coat layer 20B are preferably formed in a region extending to 50% or more of the thickness T of the partition wall 16 from the surface of the partition wall 16 facing the inlet cell 12 or the outlet cell 14 (0.5 T$\leq T_A$, 0.5 T$\leq T_B$). In this way, by forming the wash coat layer 20 in the region of at least 50% of the thickness T of the partition wall 16, it is possible to effectively improve exhaust gas purification performance while good PM collection performance is maintained as compared with conventional filters that do not satisfy the relationships of 0.5 T$\leq T_A$ and 0.5 T$\leq T_B$.

In the present embodiment, the upstream wash coat layer 20A includes an end portion on the exhaust gas inflow side X1 of the substrate 10 and extends from the end portion toward the downstream side X2 in the first direction X. The upstream wash coat layer 20A is preferably formed at a portion of at least 30% from an end portion of the total length L of the substrate 10. The upstream wash coat layer 20A is preferably formed at a portion of at least 50% from the end portion, more preferably at a portion of 80% from the end portion, for example, at a portion corresponding to 100% from the end portion. That is, when a length of the upstream wash coat layer 20A from the end portion of the substrate 10 on the exhaust gas inflow side is set to $L_A$, this $L_A$ is preferably $L_A$=0.3 L to 1 L, more preferably 0.3 L to 0.8 L. Further, the downstream wash coat layer 20B includes an end portion on the exhaust gas outflow side of the substrate 10 and extends from the end portion toward the upstream side X1 in the first direction X. The downstream wash coat layer 20B is formed, for example, at a portion of at most 80% from the end portion of the total length L of the substrate 10, typically at a portion corresponding to 50% from the end portion, for example, at a portion corresponding to 10% from the end portion. That is, when a length of the downstream wash coat layer 20B from the end portion of the substrate 10 on the exhaust gas outflow side is set to $L_B$, this $L_B$ may be $L_B=0$ L to 0.8 L, preferably $L_B=0.1$ L to 0.8 L, and more preferably 0.3 L to 0.8 L. In a case in which the upstream wash coat layer 20A and the downstream wash coat layer 20B are provided, the upstream wash coat layer 20A and the downstream wash coat layer 20B may be formed not to overlap each other in the first direction X of the substrate 10 (for example, $L_A+L_B \leq L$), but are more preferably formed to overlap each other (for example, $L<L_A+L_B$). In this case, an overlapping width between the upstream wash coat layer 20A and the downstream wash coat layer 20B may be about 0 L to 0.3 L, for example, about 0.05 L to 0.15 L.

Also, at least one of the upstream wash coat layer 20A and the downstream wash coat layer 20B may be provided, and for example, at least the upstream wash coat layer 20A may be provided. In a case in which either one is provided, a formation region of the wash coat layer 20 may cover the entire region of the substrate 10 in the first direction X. As a result, it is preferable since the exhaust gas passing through the partition wall 16 can reliably come into contact with the wash coat layer 20. Since the upstream wash coat layer 20A and the downstream wash coat layer 20B may have similar configurations except that distributed regions thereof in the partition wall 16 are different, they will be collectively described below as the wash coat layer 20.

Further, the partition wall 16 may include internal pores of various sizes. The internal pores of the partition wall 16 can be classified into, for example, a first pore group having a pore diameter of 5 μm or more but less than 10 μm, a second pore group having a pore diameter of 10 μm or more but less than 20 μm, and a third pore group having a pore diameter of 20 μm or more. For example, the first pore group appropriately contributes to collection of PM having finer particle sizes. The second pore group appropriately contributes to collection of slightly larger PM than the fine PM. The third pore group can also collect PM, but mainly contributes to low loss movement of the exhaust gas. In addition, the particulate filter 100 disclosed herein is adjusted such that arrangement of the wash coat layer 20 in the internal pores satisfies the following conditions.

That is, among the internal pores of the partition wall 16, an average filling rate A of the wash coat layer 20 held in the first pore group, an average filling rate B of the wash coat layer 20 held in the second pore group, and an average filling rate C of the wash coat layer 20 held in the third pore group satisfy the following relationships of:

$A<B<C$; and $B \leq 40\%$, and a proportion P of the pores in which a filling rate of the wash coat layer 20 is 75% or more in the first pore group and the second pore group is 35% by number or less.

In other words, the wash coat layer 20 is preferentially held in the third pore group having a larger pore diameter among the internal pores. The average filling rate B of the wash coat layer 20 disposed in the second pore group is 40% or less. Further, the average filling rate A of the wash coat layer 20 disposed in the first pore group is smaller than the average filling rate B and less than 40% or less. However, the wash coat layer 20 fills some pores to inhibit reduction in fluidity of the exhaust gas. According to the exhaust gas purification device having such a configuration, for example, it is possible to improve contact efficiency between the wash coat layer 20 and the exhaust gas while good PM collection performance is maintained. The reason for obtaining such an effect is not particularly limited, but can be considered as follows, for example.

That is, PM contained in the exhaust gas diffuses in the pores when it passes through the partition wall and is easily trapped mainly in small pores (typically pores having a pore diameter of less than 20 μm). For that reason, if the small pores are filled with the wash coat layer in advance, a collectable amount of PM may decrease, and a PM collection rate may tend to decrease. On the other hand, in the particulate filter 100 disclosed herein, the wash coat layer is not so much filled in the first and second pore groups (small pores) having relatively small pore diameters, and a decrease in PM collection performance is evenly and effectively inhibited. Further, the third pore group (large pores) having a relatively large pore diameter has a flow passage of the exhaust gas larger than that of the small pores, and a large flow rate of the exhaust gas. For that reason, by preferentially disposing the wash coat layer in the large pores having a large flow rate of the exhaust gas, chances of the contact between the wash coat layer and the exhaust gas increase, and thus the exhaust gas is efficiently purified. In addition, it is possible to effectively inhibit an increase in pressure loss due to the provision of the wash coat layer.

The average filling rate C may be larger than the average filling rate B and is not particularly limited. For example, the average filling rate C is preferably greater by 0.3% or more than the average filling rate B (for example, $C \geq B+0.3$), and more preferably greater by t 0.5% or more (for example, $C \geq B+0.5$). The particulate filter 100 disclosed herein may be preferably implemented, for example, in a mode in which the average filling rate C is greater by 1% or more than the average filling rate B (for example, $C \geq B+1$). In some embodiments, the average filling rate C may be greater, for example, by 4% or more, and greater typically by 8% or more than the average filling rate B. As a result, better exhaust gas purification performance may be realized. Further, a value obtained by subtracting the average filling rate B from the average filling rate C (that is, C−B) is preferably 30% or less, more preferably 25% or less, still more preferably 20% or less. For example, (C−B) may be at most 16%, at most 14%, or 10% or less. A specific example of the average filling rate C is preferably 20%≤C, and more preferably 25%≤C from the viewpoint of better exerting the effect (for example, the effect of improving exhaust gas purification performance) obtained by making the average filling rate C larger than the average filling rates A and B. An upper limit of the average filling rate C is not particularly limited, but is generally C≤60%, typically C≤50%, preferably C≤45% from the viewpoint of PM collection performance and inhibiting an increase in pressure loss, etc. The technique disclosed herein is preferably carried out in a mode in which the average filling rate C of the wash coat layer in the particulate filter 100 is 20%≤C≤45% (preferably 25%≤C≤45%).

The average filling rate B may be smaller than the average filling rate C and larger than the average filling rate A. For example, the average filling rate B is preferably larger by 1% or more than the average filling rate A (for example, $B \geq A+1$), and more preferably larger by 3% or more (for example, $B \geq A+3$). As a result, better exhaust gas purification performance can be realized. In some embodiments, for example, the average filling rate B may be greater by 3.5% or more than the average filling rate A, and typically greater by 4% or more. Further, a value obtained by subtracting the average filling rate A from the average filling rate B (that is, B−A) is preferably 20% or less, more preferably 15% or less, and still more preferably 10% or less. In some embodiments, for example, B−A may be 8% or less, and typically 5% or less. A specific example of the average filling rate B is approximately B≤40%, preferably B≤38%, and typically B≤35% from the viewpoint of realizing a filter having better PM collection performance. In some embodiments, for example, the average filling rate B may be B≤30%, and typically B≤25%. A lower limit of the average filling rate B is not particularly limited, but is preferably 10%≤B, more preferably 15%≤B, for example, 18%≤B, and typically 20%≤B from the viewpoint of realizing a filter catalyst having more excellent purification performance. The technique disclosed herein can be preferably carried out in an aspect in which the average filling rate C of the wash coat layer in the particulate filter is 15%≤B≤40% (preferably 20%≤B≤35%).

The average filling rate A is not particularly limited as long as the relationship of A<B<C is satisfied between the average filling rates B and C and A≤40%. The average filling rate A is preferably A≤35%, more preferably A≤32%, from the viewpoint of realizing a filter having more excellent PM collection performance. In some embodiments, for example, the average filling rate A may be A≤25%, typically A≤20% (for example, A≤18%). A lower limit of the average filling rate A is not particularly limited, but it is preferably 5%≤A, more preferably 8%≤A, for example, 10%≤A, typically 12%≤A from the viewpoint of obtaining good exhaust gas purification performance. The technique disclosed herein may be preferably carried out in a mode in which the average filling rate A of the wash coat layer in the particulate filter is 10%≤A≤35% (preferably 15%≤A≤32%).

In the first and second pore groups, a proportion P of pores having a filling rate of the wash coat layer of 75% or more is approximately 35% by number or less. This makes it possible to inhibit a decrease in the PM collection rate. The proportion P occupied by the pores having a filling rate of 75% or more in the first and second pore groups is preferably 30% by number or less, more preferably 28% by number or less, and further preferably 25% by number or less. In some embodiments, the proportion P may be, for example, 20% by number or less, and typically 15% by number or less (for example, 10% by number or less). A lower limit of the proportion P is not particularly limited, but is approximately 1% by number or more. The proportion P is preferably 3% by number or more, and more preferably 5% by number or more from the viewpoint of ease of manufacture, exhaust gas purification performance, and the like. In some embodiments, the proportion P of pores having a pore diameter of 5 µm or more but less than 20 µm and having a filling rate of 75% or more may be substantially 0% by number.

In the present specification, the pore diameters of the pores provided inside the partition wall and the filling rate of the wash coat layer held in the pores are calculated as follows. That is, (1) Using a scanning electron microscope (SEM) or a transmission electron microscope (TEM), the internal pores included in a cross-sectional SEM image or cross-sectional TEM image of the partition wall are observed, and separation of a pore is started from a site at which the largest pore diameter can be obtained in the image.

(2) In a case in which pores are connected to each other, the pores are divided when a diameter thereof is narrowed to 50% of the maximum pore diameter, and separated as one pore (in that case, the wash coat layer is treated as a pore (void)).

(3) Then, a diameter of an ideal circle (perfect circle) having the same area as an area X of the pore calculated from the separated pore image is calculated as the pore diameter.

(4) Further, an area Y of the wash coat layer held in the pores is calculated from the separated pore image, and a percentage of the value obtained by dividing the area Y of the wash coat layer by the area X of the pore (that is, 100×Y/X) is calculated as the filling rate (%) of the wash coat layer in the pore.

(5) The pore having the second largest pore diameter after the pore separated in the above (1) is separated.

Then, by repeating the processes (2) to (5) until the pore diameter of the separated pore becomes 5 µm or less, the pore diameter of the pores provided inside the partition wall and the filling rate of the wash coat layer held in the pores can be obtained. In addition, by arithmetically averaging the filling rate of the wash coat layer for each pore diameter range, the average filling rate of the wash coat layer for each pore diameter range can be derived. Further, the number of pores S1 having a pore diameter of 5 µm or more but less than 20 µm and the number of pores S2 having a pore diameter of at least 5 µm and less than 20 µm and a filling rate of 75% or more are counted, and the proportion P can be calculated using [(S2/S1)×100]. The pore diameter of each pore and the filling rate of the wash coat layer can be determined by using image analysis software executed by a computer that performs predetermined processes in accordance with a predetermined program.

Also, the pores and the wash coat layer that have been image-processed in the pore image consist of a large number of dots (pixels), and the areas X and Y of the pores and the wash coat layer can be calculated from the number of dots. Further, the average filling rates A, B, and C and the proportion P are usually preferably calculated from three typical visual fields (three different cross-sections) from the viewpoint of improving measurement accuracy and reproducibility. Specifically, (A) a variation (standard deviation: σ) of the average filling rates A, B, and C and the proportion P in each pore diameter range in the three visual fields is calculated. (B) If the variation of the average filling rates A, B, and C and the proportion P is within 3σ, the measurement is completed. (C) In a case in which the variation of the average filling rates A, B, and C and the proportion P deviates from 3σ, the average filling rates A, B, and C and proportion P are measured for yet another visual field, (D) the variations of the average filling rates A, B, and C and the proportion P of each pore diameter are calculated from the data of the entire visual fields. (E) The procedure of (C) and (D) is repeated until the variation of the average filling rates A, B, and C and the proportion P is within 3σ. As a result, measurement accuracy and reproducibility can be improved.

<Coating Amount of Wash Coat Layer>

A coating amount of the wash coat layer means a mass of the wash coat layer per unit volume of the substrate at a portion provided with the wash coat layer. The coating amount indicates a value obtained by dividing the mass of the wash coat layer by the volume of the substrate. Here, the "volume" means a bulk volume of the substrate including volumes of the substrate (including the internal pores), the cells and the like. In the present specification, unless otherwise specified, the bulk volume of the substrate may be simply referred to as the "volume". Further, the coating amount means the mass of the wash coat layer per unit volume of the substrate in a region in which the wash coat layer is formed when there is the region in which the wash coat layer is formed and a region in which the wash coat layer is not formed in the first direction X of the particulate filter. For example, in a case in which the wash coat layer 20 includes the upstream wash coat layer 20A and the downstream wash coat layer 20B, a coating amount (density) of the upstream wash coat layer 20A is a value obtained by dividing a mass of the upstream wash coat layer 20A by a bulk volume of the substrate which corresponds to an amount of the coating length $L_A$. A coating amount (density) of the downstream wash coat layer 20B is a value obtained by dividing a mass of the downstream wash coat layer 20B by a bulk volume of the substrate which corresponds to the coating length $L_B$.

The coating amount of the wash coat layer is not particularly limited as long as the average filling rates A, B, and C and the proportion P in each pore diameter range satisfy the above relationships, and the coating amount is approximately 100 g/L or less, preferably 95 g/L or less, for example 90 g/L or less, for example 85 g/L or less, typically 80 g/L or less, per 1 L of the volume of the substrate. In some embodiments, for example, the coating amount of the wash coat layer may be 75 g/L or less, typically 70 g/L or less. According to the preset configuration, by making the average filling rate of the wash coat layer held in the large pores having a large pore diameter larger than the average filling rate of the wash coat layer held in the small pores having a small pore diameter, it is possible to effectively improve exhaust gas purification performance while reducing the coating amount of the wash coat layer in the entire filter (and thus achieving reduction in the pressure loss and costs). Therefore, for example, despite a small amount of the wash coat layer in which the coating amount per 1 L of the substrate is 100 g/L or less, it is possible to realize a high-performance particulate filter 100 having excellent purification performance (in which, for example, an increase in pressure loss when the exhaust gas passes through the substrate is not caused). A lower limit of the coating amount of the wash coat layer is not particularly limited, and is preferably 25 g/L or more, more preferably 30 g/L or more, and further preferably 35 g/L or more from the viewpoint of improving purification performance Although it cannot be said unconditionally because it depends on a cell volume of the substrate, a thickness of the partition wall, a porosity, a pore size distribution, etc., in some embodiments, for example, the coating amount of the wash coat layer may be 25 g/L or more but 100 g/L or less, 25 g/L or more but 40 g/L or less, 40 g/L or more but 80 g/L or less, 60 g/L or more but 80 g/L or less, or 80 g/L or more but 100 g/L or less.

Also, in the present specification, the fact that "the wash coat layer is held in the internal pores of the partition wall" means that the wash coat layer is not on the surface of the partition wall (that is, in the cell) but mainly present inside the partition wall (on wall surfaces of the internal pores). More specifically, for example, a cross-section of the substrate is observed with an electron microscope, and the entire coating amount (area) of the wash coat layer is set to 100%. In this case, it indicates that an amount corresponding to the coating amount present on the wall surfaces of the internal pores of the partition wall is typically 80% or more (for example, 90% or more), for example 95% or more, preferably 98% or more, and further preferably 99% or more, in particular, substantially 100%, that is, there is substantially no wash coat layer on the surface of the partition wall. Therefore, for example, it is clearly distinct from the case in which a part of the wash coat layer unintentionally penetrates into the internal pores of the partition wall when the wash coat layer is intended to be disposed on the surface of the partition wall.

<Catalyst>

The wash coat layer 20 may or may not contain a catalyst. In a case in which the wash coat layer 20 contains a catalyst, the catalyst is not particularly limited. For example, it may be various catalysts that can be included in this type of particulate filter. Such a catalyst can be a so-called three-way catalyst, an SCR catalyst, an NSR catalyst, or a catalyst in which they are combined.

<Noble Metal Catalyst>

As a preferred aspect, the wash coat layer 20 may contain a three-way catalyst. For example, specifically, the wash coat layer 20 may contain a noble metal and a carrier that contains the noble metal. The noble metal contained in the wash coat layer 20 may be a substance having a catalytic function for purifying harmful components contained in the exhaust gas. As the noble metal, a metal including gold (Au), silver (Ag), palladium (Pd), rhodium (Rh), platinum (Pt), ruthenium (Ru), iridium (Ir), osmium (Os) or the like can be exemplified. More preferably, it is a metal containing a platinum group element such as Ru, Rh, Pd, Os, Ir or Pt. Any one of these may be contained, or two or more thereof may be contained. Among them, for example, at least one of Rh, Pd, and Pt is preferably contained.

It is appropriate that a content (mass) of the noble metal disposed in the wash coat layer 20 is approximately 0 g/L or more but 0.2 g/L or less per unit volume (here, 1 liter) of the substrate. From the viewpoint of realizing a catalyst having more excellent PM collection performance, it may be preferably 0.15 g/L or more, more preferably 0.1 g/L or less, still more preferably 0.08 g/L or less, for example 0.05 g/L or less. A lower limit of the content of the noble metal is not particularly limited, and for example, it can be 0.001 g/L or more from the viewpoint of lowering a combustion temperature in a regeneration process of the particulate filter 100. However, the content of the noble metal may be less than 0.001 g/L, for example 0 g/L (substantially not contained).

In a case in which the wash coat layer 20 includes the upstream wash coat layer 20A and the downstream wash coat layer 20B, the upstream wash coat layer 20A and the downstream wash coat layer 20B may or may not independently contain a catalyst. Further, in a case in which both the upstream wash coat layer 20A and the downstream wash coat layer 20B contain a catalyst, the catalyst contained in each may be the same or different. In a preferred aspect, both the upstream wash coat layer 20A and the downstream wash coat layer 20B contain noble metals, and the noble metal contained in the upstream wash coat layer 20A and the noble metal contained in the downstream wash coat layer 20B are different from each other. For example, the upstream wash coat layer 20A preferably contains Rh. The downstream wash coat layer 20B preferably contains Pd. A mass ratio (Pd/Rh) of Rh disposed in the upstream wash coat layer 20A to Pd disposed in the downstream wash coat layer 20B preferably satisfies 0.1≤(Pd/Rh), preferably 0.5≤(Pd/Rh), more preferably 1≤(Pd/Rh), and particularly preferably 1.5≤(Pd/Rh). The mass ratio (Pd/Rh) preferably satisfies (Pd/Rh)≤20, preferably (Pd/Rh)≤15, more preferably (Pd/Rh)≤10, and particularly preferably (Pd/Rh)≤5. Further, in another preferred aspect, both the upstream wash coat layer 20A and the downstream wash coat layer 20B do not contain a catalyst. As a result, the PM collection performance of the particulate filter 100 can be satisfactorily improved.

<Carrier>

The noble metal is contained in a carrier (typically in powder form). Although the carrier that contains the noble metal is not limited thereto, for example, metal oxides such as alumina ($Al_2O_3$), rare earth metal oxide, alkali metal oxide, alkaline earth metal oxide, zirconia ($ZrO_2$), ceria ($CeO_2$), silica ($SiO_2$), magnesia (MgO), titanium oxide (titania: $TiO_2$) or the like, and solid solutions thereof (for example, ceria-zirconia ($CeO_2$—$ZrO_2$) composite oxides) and the like may be exemplified. Among them, alumina and/or ceria-zirconia composite oxide is preferably used. Two or more of these may be used in combination. In addition, another material (typically, inorganic oxides) may be added to the carrier as an auxiliary component. These may be added, for example, in the form of elements, and examples of the components that may be added to the carrier include rare earth elements such as lanthanum (La) and yttrium (Y), alkaline earth elements such as calcium, alkali metal elements, and other transition metal elements. Among the above, rare earth elements such as lanthanum and yttrium are preferably used as stabilizers because they can improve a specific surface area at high temperatures without impairing a catalytic function. Such carriers can be polycrystalline or single crystal.

An amount of the noble metal contained in the above carrier is not particularly limited. For example, it is appropriately set to a range from 0.01% by mass to 2% by mass (for example, 0.05% by mass to 1% by mass) with respect to a total mass of the carrier. Further, a method for causing the noble metal to be contained in the carrier is not particularly limited. For example, it can be prepared by causing a carrier powder containing $Al_2O_3$ and/or $CeO_2$—$ZrO_2$ composite oxides to be impregnated with an aqueous solution containing a noble metal salt (for example, nitrate) or a noble metal complex (for example, a tetraamine complex), and then dried and fired.

<Method for Forming Wash Coat Layer 20>

When the wash coat layer 20 is formed, a slurry for forming the wash coat layer containing powder made of the above-mentioned refractory material and an appropriate solvent (for example, ion-exchanged water) may be prepared. In the configuration in which the wash coat layer 20 contains a catalyst, a catalyst (for example, powder made of a carrier carrying a noble metal) may be added to the slurry at a predetermined ratio.

Here, a viscosity of the slurry is one important factor from the viewpoint of realizing the magnitude relationship (A<B<C) of the average filling rate of the wash coat layer described above. That is, the viscosity of the slurry may be appropriately adjusted to easily flows into large pores (for example, pores having a pore diameter of 20 μm or more) of the internal pores of the partition wall 16, and not to easily flow into small pores (for example, pores having a pore diameter of 5 μm or more but less than 20 μm). In a preferred aspect, the slurry has a viscosity $\eta_{400}$ at a shear rate of 400 $s^{-1}$ of more than 50 mPa·s and 150 mPa·s or less, preferably 60 mPa·s or more but 110 mPa·s or less. By using the slurry having such a specific viscosity, the slurry is preferentially disposed in the large pores of the internal pores of the partition wall 16, and the wash coat layer 100 satisfying the above-mentioned magnitude relationship (A<B<C) of the average filling rate can be stably formed. Such a viscosity is also appropriate from the viewpoint of realizing the formation region (0.7 T≤$T_A$, and 0.7 T≤$T_B$) of the wash coat layer in the partition wall. In order to realize such a slurry viscosity, the slurry may contain a thickener or a dispersant. Examples of the thickener include cellulose-based polymers such as carboxymethyl cellulose (CMC), methyl cellulose (MC), hydroxypropyl methyl cellulose (HPMC), and hydroxyethyl methyl cellulose (HEMC). A content of the thickener in a total solid content of the slurry is not particularly limited as long as the viscosity of the slurry satisfies the above range, and is approximately 0.1% by mass to 5% by mass, preferably 0.3% by mass to 4% by mass, and more preferably 0.5% by mass to 3% by mass. As the dispersant, for example, a polycarboxylic acid can be preferably used. By adding the polycarboxylic acid, the large pores can be preferentially coated with the slurry while the small pores remain. The manufacturing method disclosed herein may be carried out particularly preferably in the form of using such a polycarboxylic acid. A weight average molecular weight (Mw) based on gel permeation chromatography (GPC, aqueous system, polyethylene oxide conversion) of the polycarboxylic acid may be, for example, 1 million to 2 million. The polycarboxylic acid may be used in the form of salts thereof. Examples of the salts include metal salts (for example, lithium salts, sodium salts, and potassium salts), ammonium salts and the like. Further, the viscosity of the slurry is a viscosity that can be measured by a commercially available shear viscometer at room temperature. For example, by using a dynamic viscoelasticity measuring device (rheometer) standard in the art, the viscosity can be easily measured under the conditions of the shear rate range as described above. Here, the "room temperature" indicates a temperature range of 15° C. to 35° C., and typically indicates a temperature range of 20° C. to 30° C. (for example, 25° C.).

An average particle size of particles in the above slurry (typically, constituent material powder of the wash coat layer and carrier powder carrying the noble metal) is not particularly limited, and is preferably about 1/50 to 1/3 of the average pore diameter (median diameter: $D_{50}$) of the partition wall 16. The average particle size of the particles in the slurry is more preferably about 1/40 or more, and even more preferably about 1/30 or more of the average pore diameter of the partition wall 16. The average particle size of the particles in the slurry is more preferably about 1/5 or less, more preferably about 1/10 or less of the average pore diameter of the partition wall 16. For example, in a case in which the average pore diameter of the partition wall 16 is about 15 μm to 20 μm, the average particle size of the particles in the slurry can be approximately 0.3 μm or more, preferably 0.4 μm or more, more preferably 0.5 μm or more, and can be approximately 3 μm or less, preferably 1 μm or less, and more preferably 0.7 μm or less. When the average particle size of the particles in the slurry is within the range, the slurry is likely to be preferentially disposed in the large pores of the internal pores of the partition wall 16. For that reason, the wash coat layer satisfying the magnitude relationship (A<B<C) of the average filling rate can be formed more stably. Further, the average particle diameter (median diameter: $D_{50}$) of the particles in the slurry can be confirmed on the basis of a laser diffraction/scattering method.

In the manufacturing method disclosed herein, the wash coat layer 20 is formed in the pores of the partition wall 16 by using the above slurry. The wash coat layer 20 may be formed using a suction coating method. Meanwhile, formation of the wash coat layer is generally performed using a dipping method. In the above method, the wash coat layer is formed in the pores of the partition wall by immersing the substrate in the slurry as described above to allow the slurry to permeate the substrate and flow into the pores of the partition wall, then taking out the substrate, adjusting the amount of the slurry by air blowing, and volatilizing the solvent. In the above method, since the slurry also flows into closed pores of the partition wall through which the exhaust gas does not pass, a wash coat layer that does not contribute to purification of the exhaust gas tends to be formed, and the purification performance may be deteriorated.

On the other hand, in the suction coating method disclosed herein, all or part of the slurry is applied to an end portion of the substrate on the exhaust gas inflow side or the exhaust gas outflow side (hereinafter referred to as an "end portion F"), and sucked from the other end portion (that is, a portion that becomes an end portion of the substrate on the exhaust gas outflow side or the exhaust gas inflow side, hereinafter referred to as an "end portion R") (first slurry injection). Specifically, while the viscosity of the slurry and a wetting state of the pores in the partition wall are considered, the slurry is coated on a portion corresponding to at least 50% (for example, 50% to 100%, preferably 70% to 95%) of the length of the substrate from the end portion F to the end portion R side of the substrate, and the slurry is sucked such that the slurry is coated in a region from the surface of the partition wall to at least 50% (for example, 50% to 100%, preferably 70% to 100%) of the thickness of the partition wall. Further, if necessary, the slurry is applied to the other end portion R of the substrate, coated on a portion corresponding to at most 70% (for example, 5% to 70%, more preferably 5% to 50%) of the length of the substrate from the end portion R toward the end portion F side while the viscosity of the slurry and a wetting state of the pores in the partition wall are considered, the slurry is sucked such that the slurry is coated on a region from the surface of the partition wall to at least 50% (for example, 50% to 100%, preferably 70% to 100%) of the thickness of the partition wall (second slurry injection). In this way, when the slurry is caused to flow into the pores of the partition wall by suction, the slurry preferentially easily flows into large pores (typically through holes) in the pores of the partition wall, through which the exhaust gas easily passes, and the slurry is unlikely to flow into small pores (typically closed holes) through which the exhaust gas is unlikely to pass. For that reason, the inconvenience of forming the wash coat layer that does not contribute to the purification of the exhaust gas as in the case of using the dipping method can be eliminated or alleviated, and thus the purification performance can be improved.

The suction speed (blowing speed) of the slurry is not particularly limited, and appropriately set to about 10 m/s to 80 m/s (preferably 10 m/s to 50 m/s, more preferably 15 m/s to 25 m/s). Also, a suction time of the slurry is not particularly limited, and appropriately set to about 0.1 seconds to 10 seconds (preferably 0.5 seconds to 5 seconds, more preferably 1 second to 2 seconds). Preferred examples of the technique disclosed herein include an example in which the suction speed of the slurry is 10 m/s to 30 m/s, and the suction time of the slurry is 0.5 seconds to 5 seconds, and an example in which the suction speed of the slurry is 15 m/s to 25 m/s and a suction time of the slurry is 1 second to 2 seconds. When the suction speed and suction time of the slurry are within the range, the slurry is more likely to be preferentially disposed in the large pores of the internal pores of the partition wall 16, and the wash coat layer satisfying the magnitude relationship (A<B<C) of the average filling rate can be more stably formed.

In the manufacturing method disclosed herein, the slurry flows into the pores of the partition wall 16, and is then dried and fired at a predetermined temperature. As a result, the wash coat layer 20 is held on wall surfaces of the pores of the partition wall 16. As described above, it is possible to obtain the particulate filter 100 in which the wash coat layer is formed on the wall surfaces of the pores of the partition wall 16. Also, in a case in which the slurry remains in the inlet cell 12 and the outlet cell 14, it may be removed by air blowing or the like before the drying process.

The particulate filter 100 thus obtained is formed by preferentially flowing the slurry having a specific viscosity into the large pores of the partition wall by the suction coating method. Further, according to the manufacturing method disclosed herein, for example, the slurry is applied to the end portion F of the substrate and sucked from the other end portion R. At that time, the slurry is sucked such that the region from the surface of the partition wall to at least 50% of the thickness of the partition wall is coated with the slurry. In addition, if necessary, the remaining slurry is applied to the end portion R of the substrate and sucked from the other end portion F. At that time, the slurry is sucked such that the region from the surface of the partition wall to at least 50% of the thickness of the partition wall is coated with the slurry. In this way, by sucking the slurry such that the region from the surface of the partition wall to at least 50% of the thickness of the partition wall is coated with the slurry, the wash coat layer satisfying the magnitude relationship (A<B<C) of the average filling rate and the proportion P is stably formed, and the filter having excellent PM collection performance and purification performance can be obtained. Therefore, according to the manufacturing method disclosed herein, the particulate filter 100 having a higher PM collection rate and excellent purification performance can be manufactured as compared with conventional ones.

According to the technique disclosed herein, there may be provided the manufacturing method of the exhaust gas purification filter in which, among the internal pores of the partition wall, the average filling rate A of the wash coat layer held in the pores having a pore diameter of 5 μm or more but less than 10 μm, the average filling rate B of the wash coat layer held in the pores having a pore diameter of 10 μm or more but less than 20 μm, and the average filling rate C of the wash coat layer held in the pores having a pore diameter of 20 μm or more satisfy the following relationship: A<B<C; A≤40%; and B≤40%, the proportion of the pores, in which the filling rate of the wash coat layer is 75% or more, in the pores having a pore diameter of 5 μm or more but less than 20 μm is 35% by number or less.

The manufacturing method includes: preparing (purchasing, manufacturing, etc.) the substrate of a wall flow structure that has the inlet cell in which only the end portion on the exhaust gas inflow side is open, the outlet cell which is adjacent to the inlet cell and in which only the end portion on the exhaust gas outflow side is open, and the porous partition wall which partitions the inlet cell and the outlet cell;

applying the slurry for forming the wash coat layer to the end portion F of the substrate (that is, the portion that becomes the end portion on the exhaust gas inflow side or the exhaust gas outflow side) and sucking the slurry from the other end portion R (that is, the portion that becomes the end portion of the substrate on the exhaust gas outflow side or the exhaust gas inflow side);

and drying and firing the substrate after sucking the slurry.

Here, in the above slurry sucking, the slurry is preferably sucked from the surface of the partition wall such that the slurry is coated on a region that occupies 50% or more of the thickness of the partition wall. Also, in a preferred aspect, the slurry for forming the wash coat layer may be set such that the viscosity $\eta_{400}$ at a shear rate of 400 s$^{-1}$ is more than 50 mPa·s and 150 mPa·s or less (preferably 80 mPa·s or more but 120 mPa·s or less).

The filter manufactured by such a method can be appropriately used as a particulate filter.

As shown in FIG. 3, the exhaust gas flows into the particulate filter 100 from the inlet cell 12 of the substrate 10. The exhaust gas flowing in from the inlet cell 12 passes through the porous partition wall 16 and reaches the outlet cell 14. In FIG. 3, a route through which the exhaust gas flowing in from the inlet cell 12 passes through the partition wall 16 and reaches the outlet cell 14 is indicated by an arrow. In this case, since the partition wall 16 has a porous structure and the small pores are not filled with the wash coat layer 20, particulate matter (PM) is properly collected in the surface of the partition wall 16 and in the pores inside the partition wall 16 (typically in the small pores) while the exhaust gas passes through the partition wall 16. Further, as shown in FIG. 4, since the wash coat layer 20 is provided in the pores of the partition wall 16, harmful components in the exhaust gas can be purified while the exhaust gas passes through the pores of the partition wall 16. At that time, the exhaust gas is efficiently purified in the wash coat layer 20 which is preferentially held in the large pores having a large exhaust gas flow rate. The exhaust gas that has passed through the partition wall 16 and reached the outlet cell 14 is discharged to the outside of the particulate filter 100 through an opening on the exhaust gas outflow side.

In addition, in the particulate filter 100, within the range of not impairing the essence of the present invention, the wash coat layer 20 may contain a metal oxide that does not carry the noble metal, a NOx absorber, a selective catalytic reduction (SCR) catalyst, and the like, in addition to the noble metal and the carrier described above. For the metal oxide that does not carry the noble metal, the same metal oxide as that described for the carrier can be used. The NOx absorber has a NOx occlusion capacity of absorbing NOx in the exhaust gas in a state in which the air-fuel ratio of the exhaust gas is in a lean state of excess oxygen, and releasing the absorbed NOx when the air-fuel ratio is switched to a rich side. For the NOx absorber, a basic material containing one or two or more metals capable of donating electrons to NOx can be preferably used. For example, alkali metals such as potassium (K), sodium (Na), and cesium (Cs), alkaline earth metals such as barium (Ba) and calcium (Ca), rare earths such as lanthanoids, and metals such as silver (Ag), copper (Cu), iron (Fe), and iridium (Ir) can be exemplified. Among them, a barium compound (for example, barium sulfate) has a high NOx storage capacity, and is appropriate as the NOx absorber used in the particulate filter 100 disclosed herein. The SCR catalyst may be any catalyst that purifies nitrogen oxides ($NO_x$) in the exhaust gas. The SCR catalyst is not particularly limited, and examples thereof include (3-type zeolite and silicoaluminophosphate (SAPO) zeolite. Examples of SAPO include SAPO-5, SAPO-11, SAPO-14, SAPO-17, SAPO-18, SAPO-34, SAPO-39, SAPO-42, SAPO-47 and the like. The SCR catalyst may contain any metal component. Examples of such a metal component include copper (Cu), iron (Fe), sodium (Na), potassium (K), magnesium (Mg), calcium (Ca), cobalt (Co), nickel (Ni), and zinc (Zn), silver (Ag), lead (Pb), vanadium (V), chromium (Cr), molybdenum (Mo), yttrium (Y), cerium (Ce), neodymium (Nd), tungsten (W), indium (In), yttrium (Ir) and the like. By including the above metal in SAPO, NOx can be purified more efficiently. In a case in which the wash coat layer 20 contains the SCR catalyst, a reducing agent solution supply means that supplies reducing agent solution (for example, urea water) for producing ammonia may be disposed on the upstream side of the exhaust pipe with respect to the particulate filter 100.

Test Example 1

Hereinafter, test examples relating to the present invention will be described, but the present invention is not intended to be limited to those shown in the following test examples. First, in the present test example, a technique for selectively forming the wash coat layer in a group of pores having a predetermined size in the partition wall of the substrate will be described.

Example 1

As a wall flow type substrate, a general porous cylindrical filter substrate of a honeycomb structure (made of cordierite, a length of 114.3 mm, and a volume of 1.3 L) was prepared. Further, a slurry for wash coat was prepared by mixing a palladium nitrate solution, an alumina powder, a ceria-zirconia composite oxide (CZ) powder, ion-exchanged water, and a polycarboxylic acid. In the present example, the CZ powder has a function as a marker (white) for visually recognizing a permeation region of the slurry (that is, a region in which the wash coat layer is formed) in a SEM image, which will be described later. Next, using a suction coating device, the slurry was applied to the end portion of the substrate on the exhaust gas inflow side (inlet side: X1), the slurry was sucked from the end portion on the exhaust gas outflow side (outlet side: X2) to flow into the pores of the partition wall, and then the excess slurry was removed by air blowing, thereby performing coating. Then, the whole substrate was dried and fired to form the wash coat layer in the pores of the partition wall. The viscosity $\eta_{400}$ of the slurry at a shear rate of 400 $s^{-1}$ was set to 90 mPa·s, and a coating amount of the wash coat layer per unit volume of the substrate was set to 15 g/L. The viscosity $\eta_{400}$ of the slurry was adjusted using an amount of polycarboxylic acid. As a result, the particulate filter of Example 1 provided with the wash coat layer was obtained.

Examples 2 to 8

As shown in Table 2 below, particulate filters of Examples 2 to 8 were prepared in the same manner as in Example 1 except that the coating amount of the wash coat layer per unit volume of the substrate was changed between 30 and 150 g/L.

Examples 9 to 12

Particulate filters of Examples 9 to 12 were prepared in the same manner as in Example 1 except that the viscosity $\eta_{400}$ of the slurry was changed to 200 mPa·s and the coating amount of the wash coat layer per unit volume of the substrate was changed between 40 and 100 g/L as shown in Table 2 below.

Examples 13 to 16

Particulate filters of Examples 13 to 16 were prepared in the same manner as in Example 1 except that the viscosity $\eta_{400}$ of the slurry was changed to 10 mPa·s and the coating amount of the wash coat layer per unit volume of the substrate was changed between 40 and 150 g/L as shown in Table 2 below.

<Formation Region of Wash Coat Layer>

The particulate filter of each example was cut in the X direction, and a cross-section of the partition wall of the substrate was observed using SEM to obtain an observation image. Then, on the basis of this observation image, the formation region of the wash coat layer formed in the internal pores of the partition wall and the pore diameters of the pores in which the wash coat layer was formed were observed. The pore diameters of the internal pores of the partition wall were measured using the above method. Observation results are briefly shown in the column of "Formation region of wash coat" in Table 2 below. Further, for reference, cross-sectional SEM images of the particulate filters of Examples 1, 3, 11, and 15 are shown in FIGS. 5(a) to 5(d). Also, in the cross-sectional SEM images, the wash coat layer is represented as a bright (white) region, the pores are represented as a black region (inside the partition), and the partition wall is represented as an intermediate gray region.

<Pore Size Distribution of Particulate Filter>

Figure 6:
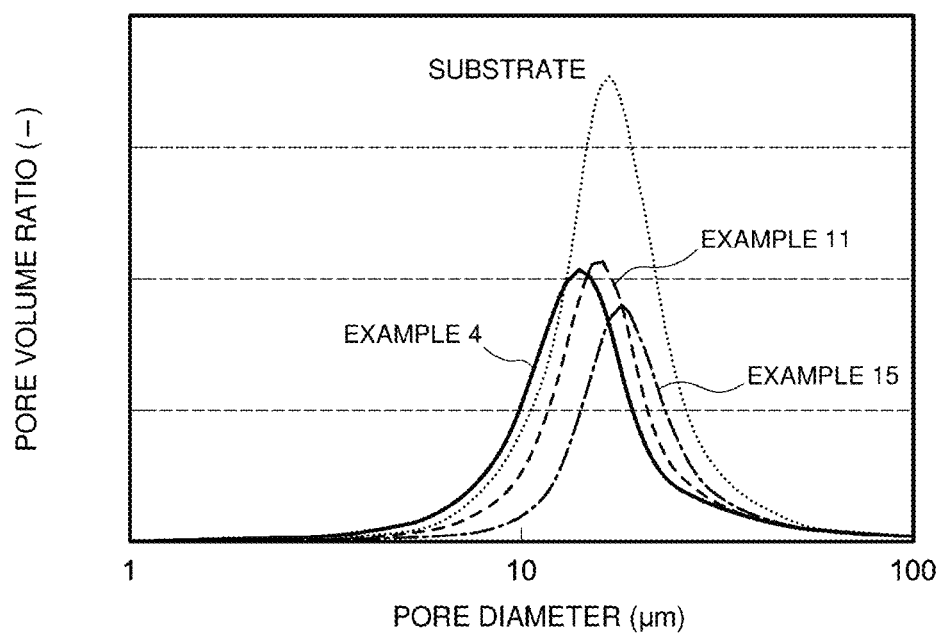
FIG. 6 is a graph showing a pore size distribution of the particulate filter of each example.

Pore size distributions of the particulate filters (a coating amount of 60 g/L) of Examples 4, 11, and 15 and substrates prepared for producing these particulate filters were measured on the basis of a mercury intrusion method, and the results are shown in FIG. 6. The pore size distribution was measured using a pore distribution measuring device Auto-Pore IV manufactured by Micromeritics Instrument Corporation. Further, in FIG. 6, a pore volume ratio corresponding to the pore diameter is plotted as a log differential pore volume distribution (dV/d(log D), where V is a pore volume and D is a pore diameter) with respect to the pore diameter (μm).

TABLE 2

| Examples | Slurry viscosity $\eta_{400}$ [mPa·s] | Coating amount [g/L] | Wash coat formation region |
|---|---|---|---|
| 1 | 90 | 15 | Inlet side large pore surface, approximately 30% |
| 2 | 90 | 30 | Inlet side large pore surface, approximately more than 60% |
| 3 | 90 | 50 | Inlet side large pore surface, reaching outlet side |
| 4 | 90 | 60 | Large pore surface, mostly reaching outlet side |
| 5 | 90 | 75 | Large pore surface, mostly reaching outlet side |
| 6 | 90 | 100 | Large pore surface, approximately reaching outlet side |
| 7 | 90 | 130 | Large pore surface, approximately reaching outlet side |
| 8 | 90 | 150 | Wash coat is almost filled inside large pores |
| 9 | 200 | 40 | Wash coat is almost filled inside large pores on inlet side |
| 10 | 200 | 50 | Wash coat is almost filled inside large pores on inlet side |
| 11 | 200 | 60 | Wash coat is almost filled inside large pores on inlet side |
| 12 | 200 | 100 | Wash coat is almost filled inside large pores on inlet side |
| 13 | 10 | 40 | Preferentially coated on surfaces of small pores on inlet side |
| 14 | 10 | 50 | Preferentially coated on surfaces of small pores on inlet side, partially reaching outlet side |
| 15 | 10 | 60 | Preferentially coated on surfaces of small pores, partially reaching outlet side |
| 16 | 10 | 150 | Preferentially coated on surfaces of small pores |

In the present test examples, the slurry was supplied only from the inlet cell such that a state of formation of the wash coat layer could be easily confirmed. As a result, as shown in FIGS. 5(a) to 5(d), it was found that the formation region of the wash coat layer formed on the substrate varied by changing the viscosity and the coating amount of the slurry for wash coat. As shown in Table 1, it was found that the formation region of the wash coat layer generally tends to expand in the thickness direction of the partition wall from the surface facing the inlet cell of the partition wall toward the surface facing the outlet cell as the coating amount increases.

The slurry used to prepare the particulate filters of Examples 1 to 8 has an appropriately adjusted viscosity and is relatively easy to be wet into the surfaces of the pores in the partition wall, but does not naturally penetrate into the small pores due to the capillary phenomenon. For that reason, it was confirmed in the wash coat layer that, for example, the formation region expands (becomes deeper) as the coating amount increases from the surface of the partition wall of the substrate facing the inlet cell toward the surface facing the outlet cell. For example, as shown in FIG. 5(a), in the particulate filter of Example 1 in which the coating amount was 15 g/L, the wash coat layer was formed only relatively in the vicinity of the inlet cell (for example, a region of about 30% in the thickness direction of the partition wall). In addition, as shown in FIG. 5(b), in the particulate filter of Example 3 in which the coating amount was increased to 50 g/L, the wash coat layer was formed up to a region reaching the surface on outlet cell side (that is, a region of 100% in the thickness direction of the partition wall). It was also found that in both the particulate filters of Examples 1 and 3, the wash coat layer was formed preferentially in the large pores over the small pores and did not block the large pores. As shown in FIG. 6, it was found that the pore size distribution was generally compressed toward the small pore diameter side and the frequency was also decreased when the pore size distribution of the particulate filter of Example 3 was compared with the pore size distribution of the substrate. Specifically, It was found that it substantially overlapped the pore size distribution of the substrate in the region of the first pore group having a pore diameter of 5 μm or more but less than 10 μm in the pore size distribution of the particulate filter of Example 3, or exceeded the pore size distribution of the substrate, but the frequency in other regions was extremely low, the wash coat layer was hardly filled in the small pores, and most of them were preferentially formed from the large pore side.

Figure 5:
FIGS. 5(*a*) to 5(*d*) are cross-sectional SEM images of partition walls of Examples 1, 3, 11, and 15, respectively.
Figure 5:
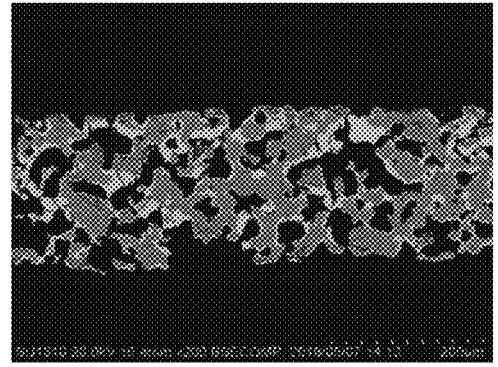
Figure 5:
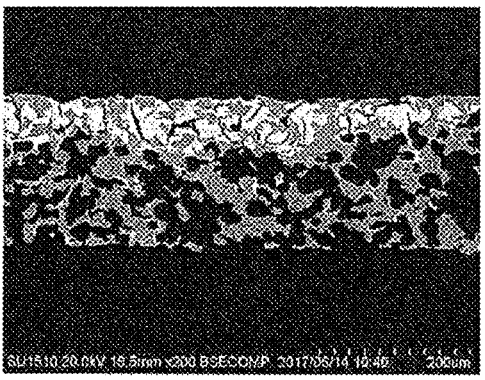
Figure 5:
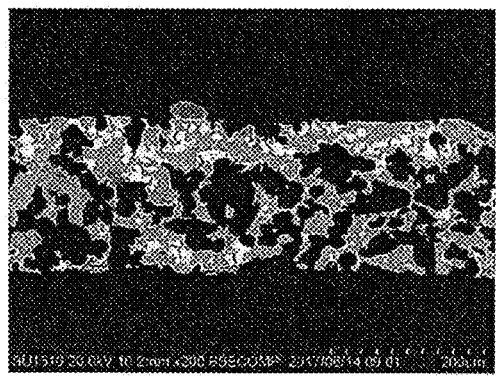

On the other hand, the slurry used for producing the particulate filters of Examples 9 to 12 has a high viscosity, is less likely to be wet into the surfaces of the pores in the partition wall, and has poor fluidity. For that reason, the slurry is, first introduced into the large pores having a relatively large diameter from an inlet side surface of the partition wall by suction to almost fill the large pores, and then is introduced into the next continuous pores. Here, since a large frictional force acts between the surfaces of the large pores and the flowing slurry, the slurry present in an area connecting a pore introduction portion for the slurry to a connection portion with the next pore easily flows, but the slurry in other areas tends to stay. Thus, it was observed that the slurry remaining in the large pores of a surface layer portion (near the surface on a side facing the inlet cell) enters medium pores and the small pores in the form of being pressed therein as the coating amount increases and even fills the medium and small pores. As a result, as shown in FIG. 5 (c), for example, in the particulate filter of Example 11, it was found that the wash coat layer was formed relatively only in the vicinity of the inlet cell (for example, a region of about 30% to 40% in the thickness direction of the partition wall) although the coating amount is relatively large at 60 g/L. In the pore size distribution of FIG. 6, the pore size distribution of the particulate filter of Example 11 is shifted toward the large pore side as a whole as compared with the pore size distribution of Example 4, and the pore size distribution and frequency of the substrate are different, but the shape is similar. From the above, it was found that in Example 11, the wash coat layer was locally formed to almost fill all of the large pores, medium pores, and small pores on the surface side facing the inlet cell of the partition wall.

Further, since the slurry used for producing the particulate filters of Examples 13 to 16 has a low viscosity, it is easily wet into the surfaces of the pores in the partition wall, easily moves without staying in the large pores by suction, and easily penetrates into the small pores due to the capillary phenomenon. As a result, as shown in FIG. 5(d), for example, in the particulate filter of Example 15, it was found that the wash coat layer was widely distributed from an inlet side surface to an outlet side surface of the substrate and was preferentially formed in the small pores rather than the large pores. In the pore size distribution of FIG. 6, the pore size distribution of the particulate filter of Example 15 shifts to the large pore side as compared with the pore size distribution of Example 11, and the frequency is low. From the above, it was found that in Example 15, most of the wash coat layer was preferentially formed from the small pores.

<Filling Rate>

Next, on the basis of the cross-sectional SEM image of the partition wall of the particulate filter shown in Table 3 below, the pore diameters of the internal pores of the partition wall and the filling rate of the wash coat layer held in the pores were measured by the above-mentioned method. Then, by arithmetically averaging the filling rate of the wash coat layer for each pore diameter range shown in Table 3 below, the average filling rate A of the wash coat layer held in the first pore group having a pore diameter of 5 μm or more but less than 10 μm, the average filling rate B of the wash coat layer held in the second pore group having a pore diameter of 10 μm or more but less than 20 μm, and the average filling rate C of the wash coat layer held in the third pore group having a pore diameter of 20 μm or more were calculated. Further, the proportion P occupied by the pores having a filling rate of 75% or more among the pores of the first and second pore groups (a pore diameter of 5 μm or more but less than 20 μm) was calculated. These results are shown in the corresponding columns of Table 3 below.

TABLE 3

| Examples | Average filling rate | | | |
| --- | --- | --- | --- | --- |
| | A (φ5 to 10 μm) [%] | B (φ10 to 20 μm) [%] | C (φ20 μm or more) [%] | P [% by number] |
| 3 | 16.7 | 20.5 | 25.3 | 7.1 |
| 4 | 24.0 | 28.3 | 29.3 | 14.6 |
| 6 | 30.7 | 33.8 | 43.1 | 22.0 |
| 10 | 22.0 | 24.0 | 24.8 | 16.7 |
| 11 | 31.7 | 35.2 | 35.9 | 28.3 |
| 12 | 32.4 | 40.0 | 43.1 | 35.4 |
| 14 | 74.7 | 22.1 | 8.5 | 36.1 |
| 15 | 77.1 | 26.4 | 5.7 | 45.7 |
| 16 | 91.1 | 71.2 | 28.7 | 83.7 |

As shown in Table 3, in the particulate filters of Examples 10 to 12 using the slurry having a viscosity $\eta_{400}$ of 200 mPa·s, the slurry did not flow deep into the partition wall and remained in the surface layer portion. As a result, for example, as in Examples 10 and 11, it was found that the proportion P occupied by the pores having a filling rate of 75% or more in the first and second pore groups can be 35% or less by number by adjusting the coating amount to a small amount. However, in the case of using a highly viscous slurry, if the coating amount is small, there is a trade-off that the wash coat layer cannot be formed in a wide area of the partition wall. Further, it was confirmed in the catalysts of Examples 14 to 16 using the slurry having a viscosity $\eta_{400}$ of 10 mPa·s that, although the slurry flowed deep into the partition wall and reached a back surface side, the relationship between the average filling rate A of the wash coat layer held in the first pore group, the average filling rate B of the wash coat layer held in the second pore group, and the average filling rate C of the wash coat layer held in the third pore group was A>B>C, and the wash coat layer was preferentially formed in the pores having a small pore diameter among the internal pores of the partition wall. As a result, it was found that the proportion P occupied by the pores having a filling rate of 75% or more in the first and second pore groups in all the examples exceeded 35% by number. On the other hand, it was confirmed in the particulate filters of Examples 3, 4 and 6 using a slurry having a viscosity $\eta_{400}$ of 90 mPa·s that the relationship between the average filling rates A, B, and C was A<B<C, the average filling rates A and B were all 40% or less, and thus the wash coat layer was preferentially formed in the pores having a large pore diameter among the internal pores of the partition wall. Further, it was found in the particulate filters of Examples 3, 4, and 6 that the wash coat layer was widely formed up to the back surface side of the partition wall, and the proportion P occupied by the pores having a filling rate of 75% or more in the first and second pore groups was inhibited to 35% by number or less.

From the above, it was confirmed that, by appropriately fine-tuning the viscosity of the slurry for wash coat in accordance with the pore size distribution of the wall flow type substrate for use, the wash coat layer was preferentially formed in the large pore group having a predetermined size while avoiding the small pore group having a predetermined size, and the wash coat layer was formed without filling the large pores. Also, although not specifically shown, the particulate filter provided with such a wash coat layer can achieve both PM collection performance and exhaust gas purification performance improvement at a high level.

Test Example 2

In the present test example, an effect of an amount of the noble metal catalyst carried by the wash coat layer of the particulate filter on the PM collection rate was confirmed.

Example 2-1

By supplying the wash coat slurry from both the inlet cell and the outlet cell, a particulate filter including the upstream wash coat layer and the downstream wash coat layer was produced. Specifically, the same wall flow type substrate as in Test Example 1 was used for the substrate, and a slurry similar to that of Example 1 of Test Example 1 but not containing CZ powder and a palladium nitrate solution was used for the slurry for wash coat. Then, a portion corresponding to 60% of the length L was immersed in the slurry from the end portion on the inlet side to the outlet side of the substrate and then coated by suction, the excess slurry was removed by air blowing, and dried and fired, whereby the upstream wash coat layer was formed inside the partition wall of the substrate. The viscosity $\eta_{400}$ of the slurry was 90 mPa·s, and the coating amount of the upstream wash coat layer was 50 g/L. The filling rates A, B, and C and the proportion P of the upstream wash coat layer were equivalent to those of Example 3 of Test Example 1.

Next, using the same slurry as on the upstream side, a portion corresponding to 60% of the length L of the substrate was immersed in the slurry from the end portion of the substrate on the outlet side toward the upstream side and then coated by suction, the excess slurry was removed by air blowing, and dried and fired, whereby the downstream wash coat layer was formed inside the partition wall. The coating amount of the downstream wash coat layer was 50 g/L. The filling rates A, B, and C and the proportion P of the downstream wash coat layer were equivalent to those of Example 3 of Test Example 1. The upstream wash coat layer and the downstream wash coat layer are formed to overlap each other at a center of the substrate in the length direction, which corresponds to 20% of the length L of the substrate. As a result, the particulate filter of Example 2-1 was obtained. The amount of the noble metal catalyst per particulate filter is 0 g.

Examples 2-2 to 2-5

Particulate filters of Examples 2-2 to 2-5 were prepared in the same manner as in Example 2-1 above except that a slurry containing a palladium nitrate solution was used for the slurry for wash coat as in Example 1 of Test Example 1. However, a concentration of the palladium nitrate solution in the slurry was adjusted such that an amount of palladium per unit volume of the substrate was 0.2 to 1.5 g/L as shown in Table 4 below. The filling rates A, B, and C and the proportion P of the wash coat layer on the upstream side and the downstream side were equivalent to those in Example 2-1.

<PM Collection Performance>

The PM collection performance of the particulate filter in each example was evaluated. Specifically, the particulate filter of each example was installed in an exhaust path of a vehicle (a 2 L gasoline engine), and the vehicle was operated in the Phase 4 mode by WLTP. Then, the amount X of PM discharged through the particulate filter and the amount Y of PM discharged with the particulate filter removed were measured, and the PM collection rate was calculated by the following equation: PM collection rate (%)=[(Y−X)/Y]× 100. The results are shown in Table 4 below and FIG. 7.

TABLE 4

| Examples | Inlet side wash coat | | Outlet side wash coat | | Pd amount [g/L] | PM collection rate [%] |
|---|---|---|---|---|---|---|
| | Coating amount [g/L] | Coating length $L_A$ [%] | Coating amount [g/L] | Coating length $L_B$ [%] | | |
| 2-1 | 50 | 60 | 50 | 60 | 0.0 | 80.1 |
| 2-2 | 50 | 60 | 50 | 60 | 0.2 | 79.3 |
| 2-3 | 50 | 60 | 50 | 60 | 0.5 | 73.8 |
| 2-4 | 50 | 60 | 50 | 60 | 1.0 | 65.1 |
| 2-5 | 50 | 60 | 50 | 60 | 1.5 | 62.7 |

Figure 7:
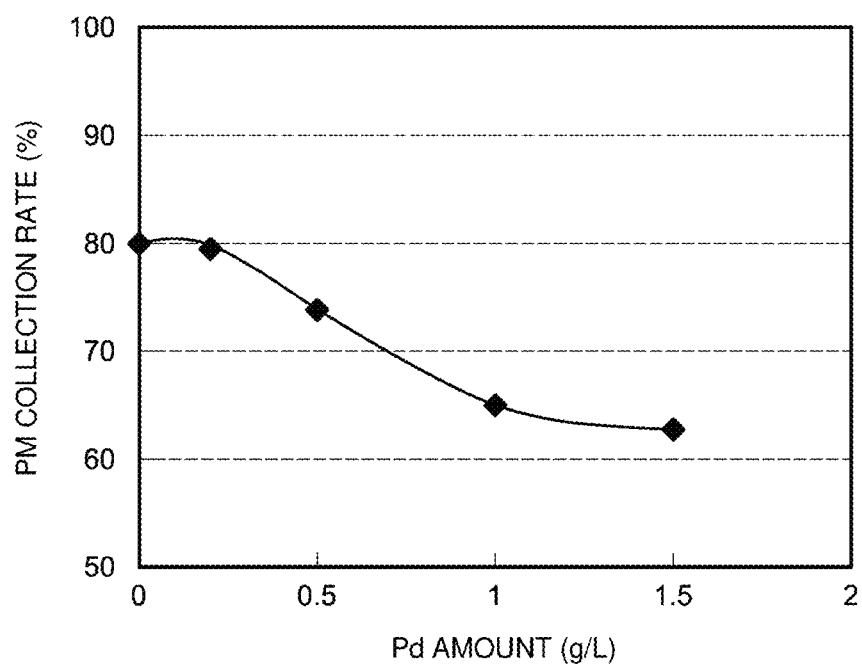
FIG. 7 is a graph showing a relationship between an amount of Pd and a PM collection rate of the particulate filter of each example.

As shown in Table 4 and FIG. 7, the particulate filter of each example satisfies the conditions that the relationship between the average filling rate A, the average filling rate B, and the average filling rate C of the wash coat layer is A<B<C, and B≤40%, and the proportion P is 35% by number or less. Further, it was confirmed that the wash coat layer was formed in a region occupying 50% or more of the thickness of the partition wall on both the upstream side and the downstream side. However, it was found that the PM collection rate of the particulate filter varies greatly depending on the amount of the noble metal catalyst. That is, until now, it is thought that if the wash coat layer is formed to satisfy predetermined filling rates A, B, and C and proportion P, the PM collection performance of the particulate filter and the improvement of the exhaust gas purification performance can be compatible at a high level. However, in the case of focusing on the PM collection rate, it can be seen that the PM collection rate decreases as the amount of the noble metal catalyst carried increases. This is presumed to be due to the following reasons. That is, as PM collection progresses, PM is accumulated in the pores of the particulate filter, and the PM collection rate gradually increases. Here, it is thought that the PM captured in the pores coexists with the noble metal catalyst to promote combustion of PM even in a normal operation mode, and an amount of PM accumulated decreases and is difficult to increase. As a result, it is thought that the PM collection rate in the first test also decreases depending on the noble metal catalyst. From the above, it can be said that it is preferable from the viewpoint of surely increasing the PM collection rate that limiting the noble metal catalyst to a small amount of 0.2 g/L or less enables PM to be suitably accumulated until regeneration and increases the PM collection rate. Further, it can be seen that the noble metal catalyst may be, for example, 0 g/L.

Test Example 3

In the present test example, an effect of the coating amount of the wash coat layer on the particulate filter on the PM collection rate was confirmed.

Examples 3-1 to 3-6

As the substrate and the slurry for wash coat, the same wall flow type substrate and slurry (that is, without a noble metal catalyst) as in Example 2-1 of Test Example 2 were prepared. Then, using a suction coating device, the slurry was supplied to the end portion of the substrate on the exhaust gas inflow side (inlet side: X1) and sucked from the end portion of the exhaust gas outflow side (outlet side: X2), whereby the slurry was allowed to flow into the pores of the partition wall, and the excess slurry was removed by air blowing, thereby coating the inside of the partition wall. Then, the whole substrate was dried and fired to form the wash coat layer in the pores of the partition wall. The viscosity $\eta_{400}$ of the slurry was 90 mPa·s, and the coating amount of the wash coat layer per unit volume of the substrate was changed between 0 and 130 g/L as shown in Table 5 below. As a result, a particulate filter of Example 3-1 without the wash coat layer (that is, a bare substrate) and a particulate filter of Examples 3-2 to 3-6 with the wash coat layer were obtained. Also, the particulate filter of each example does not contain a noble metal catalyst.

In the particulate filters of Examples 3-2 to 3-6, it was confirmed that the relationship between the average filling rates A, B, and C of the wash coat layer is A<B<C, the average filling rates A and B are all 40% or less, and the wash coat layer is preferentially formed in the pores having a large pore diameter among the internal pores of the partition wall. Further, the proportion P of the pores, in which a filling rate of the wash coat layer is 75% or more, in the first and second pore groups is inhibited to 35% by number or less. In addition, in the particulate filters of Examples 3-3 to 3-6, the wash coat layer reached from the surface of the partition wall on the inlet side to the surface on a side opposite thereto, whereas in the particulate filter of Example 3-2, the region in which the wash coat layer was formed was a region having a thickness of about 50% from the surface of the partition wall on the inlet side since the coating amount was as small as 25 g/L.

<PM Collection Performance>

The PM collection performance of the particulate filter in each example was evaluated. Specifically, the particulate filter of each example was installed in the exhaust path of the vehicle (2 L gasoline engine), and the vehicle was operated in the Phase 4 mode by WLTP. Then, the amount X of PM discharged through the particulate filter and the amount Y of PM discharged with the particulate filter removed were measured, and the PM collection rate was calculated by the following equation: PM collection rate (%)=[(Y−X)/Y]× 100. The results are shown in Table 5 below and FIG. 8.

<Pressure Loss Increase Characteristics>

Figure 9:
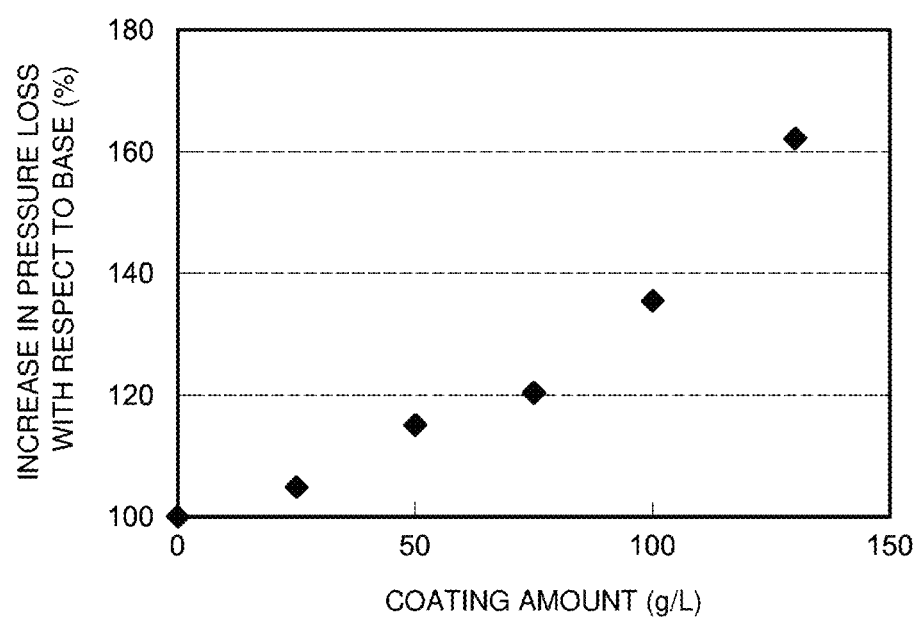
FIG. 9 is a graph showing a relationship between the coating amount and a pressure loss increase rate of the particulate filter of each example.

Pressure loss increase characteristics of the particulate filter of each example were evaluated. The pressure loss of the particulate filter corresponds to an energy loss (a required force) per unit time and unit flow rate when a gas is passed through the particulate filter. Therefore, for the particulate filter of each example, a pressure Px required to circulate air at an air volume of 7 m³/min was measured. Then, a ratio of a pressure Pn for each particulate filter to a pressure P1 for the particulate filter (bare substrate) of Example 3-1 was calculated as a pressure loss increase rate on the basis of the following equation: pressure loss increase rate (%)=Pn/P1×100. The results are shown in Table 5 below and FIG. 9. When this value decreases, it represents that an increase in pressure loss due to the formation of the wash coat layer is inhibited to be lower.

TABLE 5

| Examples | Coating amount [g/L] | PM collection rate [%] | Pressure loss increase rate [%] |
| --- | --- | --- | --- |
| 3-1 | 0 | 65.1 | 100.0 |
| 3-2 | 25 | 75.0 | 104.8 |
| 3-3 | 50 | 80.1 | 115.2 |
| 3-4 | 75 | 86.3 | 120.4 |
| 3-5 | 100 | 90.3 | 135.5 |
| 3-6 | 130 | 91.1 | 162.2 |

Figure 8:
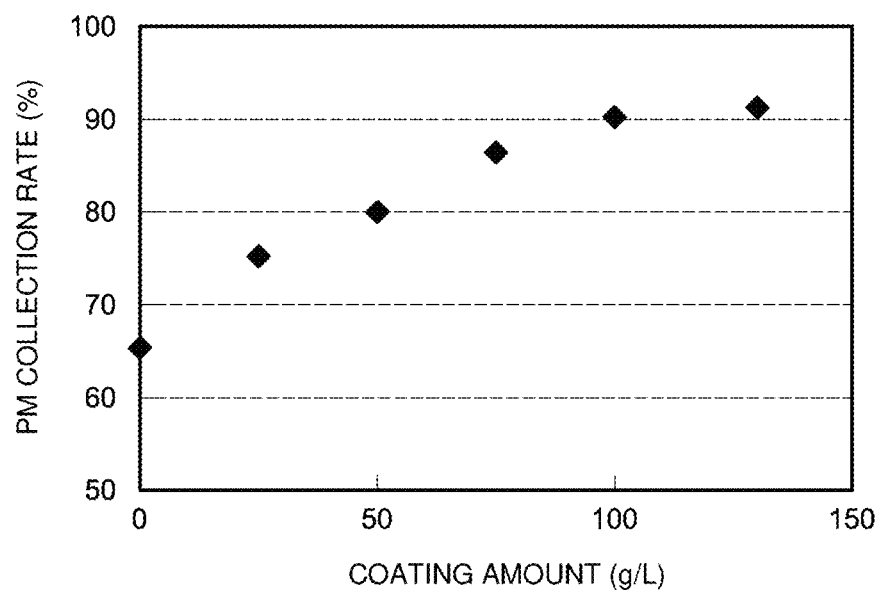
FIG. 8 is a graph showing a relationship between a coating amount and the PM collection rate of the particulate filter of each example.

As shown in Table 5 and FIG. 8, it was confirmed that the PM collection rate of the particulate filter tends to increase as the coating amount of the wash coat layer increases. If the coating amount exceeds 0 g/L, the PM collection rate will increase when an even little wash coat layer is formed. In the present example, it was possible to clearly confirm that since arrangement and the like of the wash coat layer with respect to the bare substrate was appropriately controlled, the PM collection rate was increased, for example, even when the coating amount was as small as about 25 g/L. Also, it was found that, with respect to the combination of the substrate and the wash coat layer used in the present example, a coating amount of about 100 g/L was sufficient since an increase in the PM collection rate almost stops when the coating amount reaches about 100 g/L.

On the other hand, it was confirmed that the pressure loss increase rate tends to increase almost linearly as the coating amount of the wash coat layer increases. The coating amount should be small from the viewpoint of keeping the pressure loss increase rate low. From these facts, it can be said that when the coating amount is set to about 25 g/L or more, for example, about 100 g/L or less, increasing the PM collection rate can be compatible with inhibiting the pressure loss increase rate.

Although various modified examples of the particulate filter 100 and the exhaust gas purification device 1 provided with the filter 100 have been illustrated as described above, the structures of the particulate filter 100 and the exhaust gas purification device 1 are not limited to any of the above-described embodiments.

For example, in Test Example 2 described above, the length $L_A$ of the portion at which the upstream wash coat layer 20A is formed and the length $L_B$ of the portion at which the downstream wash coat layer 20B is formed in the length direction of the substrate are the same, but the structure of the wash coat layer 20 is not limited thereto. For example, the length $L_B$ of the portion at which the downstream wash coat layer 20B is formed may be longer or shorter than the length $L_A$ of the portion at which the upstream wash coat layer 20A is formed. Further, the wash coat layer 20 may be formed by adding the slurry once without dividing the wash coat layer into the upstream wash coat layer 20A and the downstream wash coat layer 20B. Even in this case, the average filling rates A, B, and C of the wash coat layer held in the pores for each pore diameter range satisfy the above relationship, and the proportion of the pores having a filling rate of 75% or more in the pores having a pore diameter of 5 μm or more but less than 20 μm is set to 35% by number or less, and thus the PM collection performance can be highly improved.

Moreover, although only an example in which Rh is used for the noble metal catalyst contained in the wash coat layer 20 has been shown, the noble metal catalyst can be appropriately changed in consideration of a main use, a main operating condition and the like of the vehicle provided with the particulate filter 100 and active characteristics of the noble metal catalyst.

Further, the shape and structure of each member and portion of the exhaust gas purification device 1 may be changed. The catalyst unit 5 is provided on the upstream side of the filter unit 6 in the example shown in FIG. 1, but the catalyst unit 5 may be omitted. The exhaust gas purification device 1 is particularly suitable as a device for purifying harmful components in exhaust gas having a relatively high exhaust temperature, such as a gasoline engine. However, the exhaust gas purification device 1 according to the present invention is not limited to the use of purifying harmful components in the exhaust gas of a gasoline engine, and can be used in various applications for purifying harmful components in exhaust gas emitted from another engine (for example, a diesel engine).

REFERENCE SIGNS LIST

1 Exhaust gas purification device
10 substrate
12 Inlet cell
14 Outlet cell
16 Partition wall
18 Internal pore
20 Wash coat layer
20A Upstream wash coat layer
20B Downstream wash coat layer
100 Particulate filter

The invention claimed is:

1. A particulate filter disposed in an exhaust path of an internal combustion engine and used to collect particulate matter from exhaust gas discharged from the internal combustion engine, the particulate filter comprising:

a substrate having a wall flow structure including a porous partition wall partitioning an inlet cell that includes an open end portion on an exhaust gas inflow side and an outlet cell that is adjacent to the inlet cell and has an open end portion on an exhaust gas outflow side; and
a wash coat layer formed inside the partition wall, wherein
the wash coat layer is held on surfaces of internal pores of the partition wall,
among the internal pores of the partition wall,
an average filling rate A of the wash coat layer held in a first pore group having a pore diameter of 5 μm or more but less than 10 μm,
an average filling rate B of the wash coat layer held in a second pore group having a pore diameter of 10 μm or more but less than 20 μm, and
an average filling rate C of the wash coat layer held in a third pore group having a pore diameter of 20 μm or more satisfy relationship below:
A<B<C; and B≤40%,
among pores of the first pore group and the second pore group, in which a proportion of pores having a wash coat layer filling rate of 75% or more is 35% by number or less,
the wash coat layer is formed in a region that occupies 50% or more of a thickness of the partition wall from at least a part of a surface of the partition wall facing at least one of the inlet cell and the outlet cell, and
an amount of a noble metal catalyst carried by the wash coat layer is 0 g/L or more but 0.2 g/L or less, wherein
the average filling rate A satisfies 10%≤A≤35%,
the average filling rate B satisfies 15%≤B≤40%, and
the average filling rate C satisfies 20%≤C≤45%.

2. The particulate filter according to claim 1, wherein the wash coat layer does not contain the noble metal catalyst.

3. The particulate filter according to claim 1, wherein
when a direction from the exhaust gas inflow side to the exhaust gas outflow side is defined as a flow direction, the wash coat layer includes:
an upstream wash coat layer that includes a surface of the partition wall facing the inlet cell and is provided in a region following the flow direction from an end portion on the exhaust gas inflow side; and
a downstream wash coat layer that includes a surface of the partition wall facing the outlet cell and is provided in a region following the flow direction from an end portion on the exhaust gas outflow side.

4. The particulate filter according to claim 3, wherein a length LA of the upstream wash coat layer from the end portion on the exhaust gas inflow side in the flow direction is ½ or more of a total length L of the substrate.

5. The particulate filter according to claim 3, wherein a length LB of the downstream wash coat layer from the end portion on the exhaust gas outflow side in the flow direction is ½ or more of a total length L of the substrate.

6. The particulate filter according to claim 1, wherein the internal combustion engine is a gasoline engine.

* * * * *